US011331754B2

(12) United States Patent
Sievers et al.

(10) Patent No.: US 11,331,754 B2
(45) Date of Patent: May 17, 2022

(54) ADDITIVE MANUFACTURING APPARATUS AND SYSTEM WITH A PART DETACHMENT ASSEMBLY, AND METHOD OF USING THE SAME

(71) Applicant: The Boeing Company, Chicago, IL (US)

(72) Inventors: Daniel E. Sievers, Owens Cross Roads, AL (US); Peter J. Bocchini, Huntsville, AL (US)

(73) Assignee: The Boeing Company, Chicago, IL (US)

( * ) Notice: Subject to any disclaimer, the term of this patent is extended or adjusted under 35 U.S.C. 154(b) by 839 days.

(21) Appl. No.: 16/200,463

(22) Filed: Nov. 26, 2018

(65) Prior Publication Data

US 2020/0164464 A1 May 28, 2020

(51) Int. Cl.
*B33Y 10/00* (2015.01)
*B33Y 30/00* (2015.01)
*B23K 26/34* (2014.01)
*B33Y 40/00* (2020.01)
*B33Y 50/02* (2015.01)
(Continued)

(52) U.S. Cl.
CPC ............ *B23K 26/34* (2013.01); *B23K 26/354* (2015.10); *B23K 26/38* (2013.01); *B33Y 10/00* (2014.12); *B33Y 30/00* (2014.12); *B33Y 40/00* (2014.12); *B33Y 50/02* (2014.12)

(58) Field of Classification Search
CPC .. B23K 26/34–342; B33Y 10/00; B33Y 30/00
See application file for complete search history.

(56) References Cited

U.S. PATENT DOCUMENTS 9,156,056 B2 * 10/2015 Abe .......................... B05C 9/14
9,718,239 B2    8/2017 Huang
(Continued)

FOREIGN PATENT DOCUMENTS

CN     110666166 A    1/2020
DE   202011051161 U1  12/2012
(Continued)

OTHER PUBLICATIONS

Extended European Search Report (EESR), European Patent Office, dated Mar. 23, 2020, for Application No. EP19194157.4, Applicant The Boeing Company, 10 pages.

*Primary Examiner* — Michael A Laflame, Jr.

(57) ABSTRACT

An AM apparatus for an AM process is provided. The AM apparatus includes a build chamber with a build plate to support one or more parts built with a powder, during a build operation. The AM apparatus further includes a laser assembly operable to deliver a melting laser beam, to melt and fuse the powder used to build the one or more parts. The AM apparatus further includes a part detachment assembly, separate from the laser assembly and operable for a cutting operation. The part detachment assembly includes one or more laser beam delivery apparatuses, each operable to deliver a cutting laser beam, and a part holder apparatus. During the cutting operation, the part holder apparatus holds the one or more parts, and each of the laser beam delivery apparatus(es) delivers the cutting laser beam, to detach the one or more parts from the build plate within the AM apparatus.

24 Claims, 15 Drawing Sheets

(51) Int. Cl.
*B23K 26/354* (2014.01)
*B23K 26/38* (2014.01)

(56) References Cited

U.S. PATENT DOCUMENTS

| | | |
|---|---|---|
| 10,011,089 B2 | 7/2018 | Lyons et al. |
| 2017/0304938 A1* | 10/2017 | Chen .................. B23K 26/0626 |
| 2018/0214955 A1* | 8/2018 | Kottilingam ............ B22F 10/38 |
| 2018/0214988 A1 | 8/2018 | Alves |

FOREIGN PATENT DOCUMENTS

| | | |
|---|---|---|
| WO | 2018141476 A1 | 8/2018 |
| WO | 2018169824 A1 | 9/2018 |

* cited by examiner

ADDITIVE MANUFACTURING APPARATUS AND SYSTEM WITH A PART DETACHMENT ASSEMBLY, AND METHOD OF USING THE SAME

BACKGROUND

1) Field of the Disclosure

The disclosure relates generally to apparatuses, systems, and methods for manufacturing parts, and more particularly, to apparatuses, systems, and methods for additive manufacturing of parts, such as aircraft parts.

2) Description of Related Art

Various aircraft parts may be manufactured using additive manufacturing (AM) processes. Additive manufacturing processes are used to fabricate or manufacture three-dimensional (3D) parts or objects by adding layer-upon-layer of a build material, such as a powder, using computer controlled additive manufacturing (AM) machines or apparatuses, and computer software, such as computer-aided design (CAD) software.

In particular, metal aircraft parts may be manufactured using an AM process that uses a high-power laser or electron beam to melt and fuse build material, such as metal powder, and additively build one or more parts layer by layer in a build chamber with a build operation. The one or more parts being built in the build operation are typically built on a build plate made of a same or similar material as the build material. During the build operation of such AM process, the one or more parts formed on the build plate become fused or welded to the build plate with a laser and must be detached or removed from the build plate before the build plate can be used for building another part or parts.

A known method and apparatus for detaching and removing the one or more parts from the build plate include manually removing the build plate with the one or more attached parts from within the additive manufacturing (AM) apparatus, manually transporting the build plate with the one or more attached parts from the AM apparatus to a cutting or machining device, for example, a band saw, a lathe, or an electrical discharge machining (EDM) device, and using the cutting or machining device to mechanically cut and detach or remove the one or more parts from the build plate. However, by mechanically using a cutting or machining device, such as a band saw or lathe, it may be difficult to obtain an accurate and even cut across the bottom or base of the one or more parts, when detaching or separating the one or more parts from the build plate. Moreover, manually removing and transporting the build plate with the one or more attached parts, from the AM apparatus to the cutting or machining device, and mechanically cutting or machining the one or more parts to detach the one or more parts from the build plate, may be time consuming and labor intensive, and may result in increased manufacturing costs.

Therefore, it would be advantageous to have an AM apparatus, system, and method that take into account one or more of the issues discussed above, that avoid manual removal and transport of the build plate with the attached part or parts, from the AM apparatus to a mechanical cutting or machining device, that avoid using a mechanical cutting or machining device to mechanically cut and detach or remove the part or parts from the build plate, and that provide advantages over known apparatuses, systems, and methods.

SUMMARY

Example implementations of the present disclosure provide for an additive manufacturing (AM) apparatus, system, and method that provide significant advantages over existing apparatuses, systems, and methods.

In one version there is provided an additive manufacturing apparatus for an additive manufacturing process. The additive manufacturing apparatus comprises a build chamber comprising a build plate to support one or more parts built with a powder, during a build operation. The additive manufacturing apparatus further comprises a laser assembly operable to deliver a melting laser beam, to melt and fuse the powder used to build the one or more parts.

The additive manufacturing apparatus further comprises a part detachment assembly, separate from the laser assembly and operable for a cutting operation. The part detachment assembly comprises one or more laser beam delivery apparatuses, each operable to deliver a cutting laser beam. The part detachment assembly further comprises a part holder apparatus coupled to the one or more laser beam delivery apparatuses. The part detachment assembly is operable to move, after the build operation, so that the part holder apparatus and the one or more laser beam delivery apparatuses are at a position adjacent to the one or more parts.

During the cutting operation, the part holder apparatus holds the one or more parts, and each of the one or more laser beam delivery apparatuses delivers the cutting laser beam, to detach the one or more parts from the build plate within the additive manufacturing apparatus.

In another version there is provided an additive manufacturing system for an additive manufacturing process. The additive manufacturing system comprises an additive manufacturing apparatus. The additive manufacturing apparatus comprises a housing structure that houses a build chamber comprising a build plate to support one or more parts built with a powder, during a build operation. The housing structure further houses a laser assembly operable to deliver a melting laser beam, to melt and fuse the powder used to build the one or more parts.

The housing structure further houses a part detachment assembly, separate from the laser assembly and operable for a cutting operation. The part detachment assembly comprises one or more laser beam delivery apparatuses, each operable to deliver a cutting laser beam. The part detachment assembly further comprises a part holder apparatus coupled to the one or more laser beam delivery apparatuses. The part detachment assembly is operable to move, after the build operation, so that the part holder apparatus and the one or more laser beam delivery apparatuses are at a position adjacent to the one or more parts.

The part detachment assembly further comprises an electromagnetic actuation system coupled to the part holder apparatus and to the one or more laser beam delivery apparatuses. The electromagnetic actuation system is operable to rotate the one or more laser beam delivery apparatuses during the cutting operation.

During the cutting operation, the part holder apparatus holds the one or more parts, and each of the one or more laser beam delivery apparatuses delivers the cutting laser beam, to detach the one or more parts from the build plate within the additive manufacturing apparatus.

In another version there is provided a method of using an additive manufacturing apparatus having a part detachment assembly, to automatically detach one or more parts, built during an additive manufacturing process. The method comprises the step of building one or more parts on a build plate in a build chamber of the additive manufacturing apparatus. The one or more parts are built with a powder and fused to the build plate with a laser assembly, during a build operation.

The method further comprises the step of deploying, via an actuation system, the part detachment assembly coupled within the additive manufacturing apparatus, from a stowed position to a fully extended position. The part detachment assembly comprises one or more laser beam delivery apparatuses separate from the laser assembly. The part detachment assembly further comprises a part holder apparatus coupled to the one or more laser beam delivery apparatuses.

The method further comprises the step of positioning the part holder apparatus and the one or more laser beam delivery apparatuses at a position adjacent to the one or more parts. The method further comprises the step of actuating the part holder apparatus, via the actuation system, to compress against one or more of the one or more parts, to hold in place the one or more parts. The method further comprises the step of performing a cutting operation, by delivering a cutting laser beam, via each of the one or more laser beam delivery apparatuses, to automatically detach the one or more parts from the build plate within the additive manufacturing apparatus.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary version, but which are not necessarily drawn to scale, wherein.

The figures shown in this disclosure represent various aspects of the embodiments presented, and only differences will be discussed in detail.

DETAILED DESCRIPTION

Disclosed versions or embodiments will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

Figure 1A:
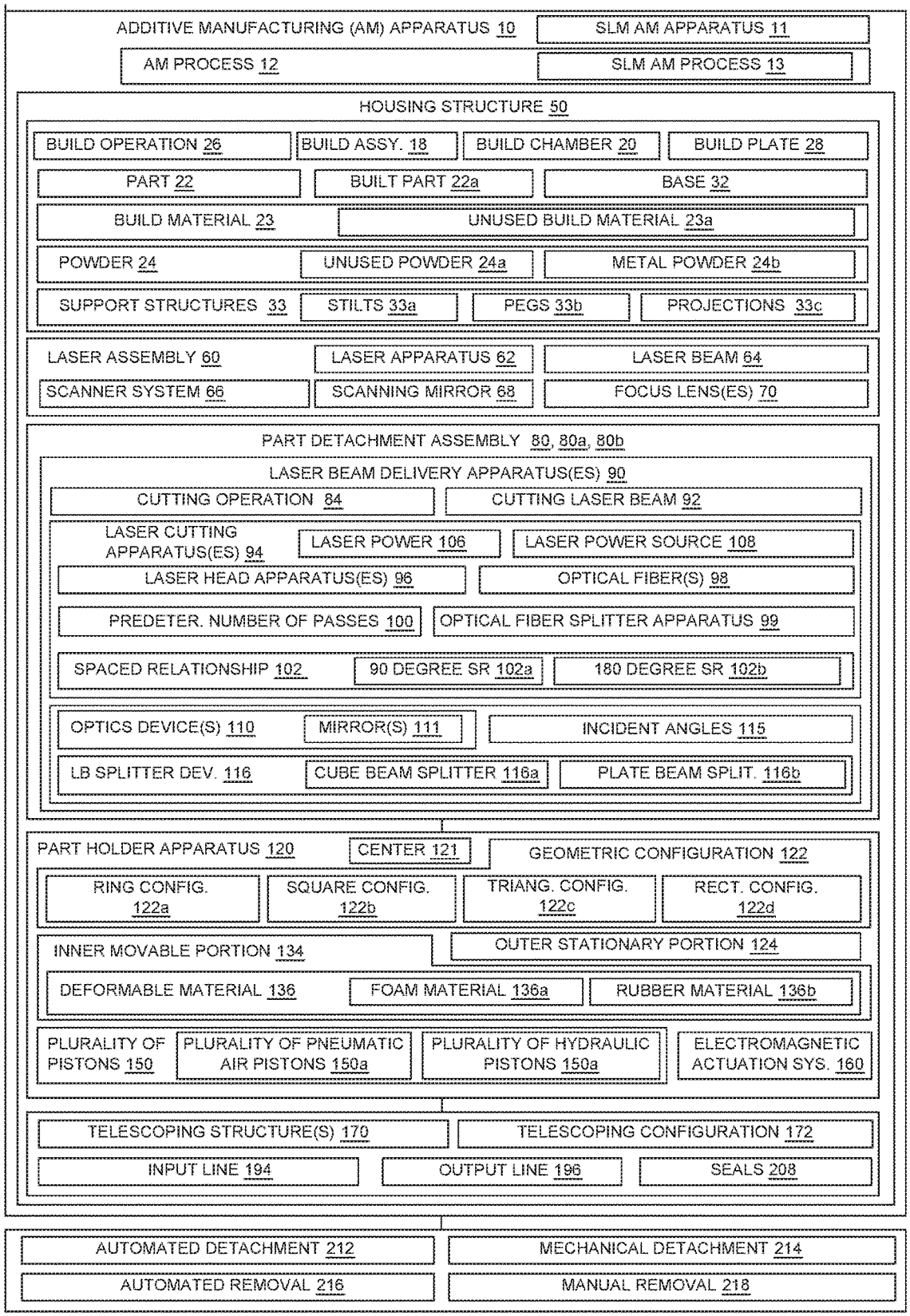
FIG. 1A is an illustration of a functional block diagram showing an exemplary version of an additive manufacturing apparatus of the disclosure.
Figure 1B:
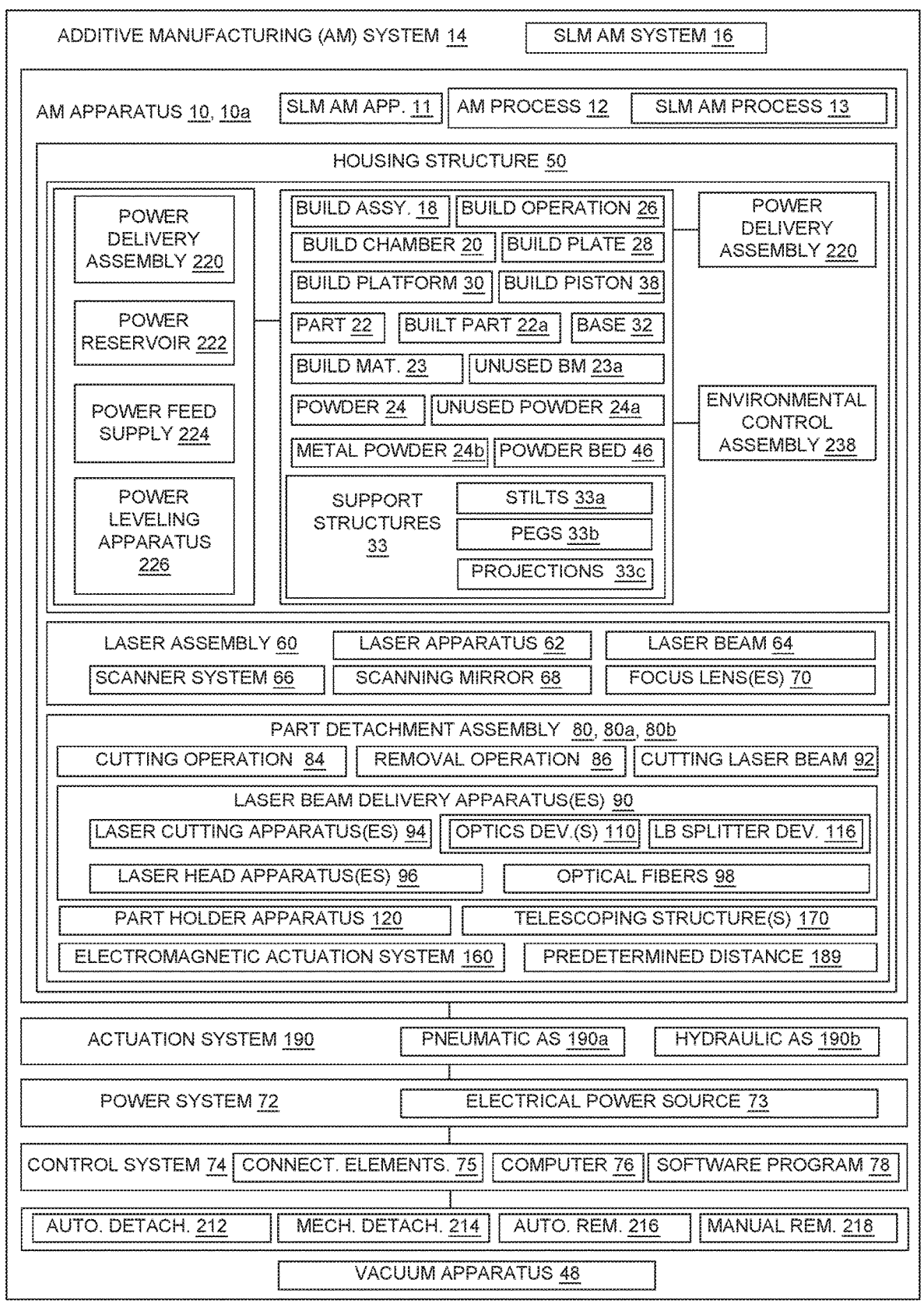
FIG. 1B is an illustration of a functional block diagram showing an exemplary version of an additive manufacturing system of the disclosure.
Figure 2A:
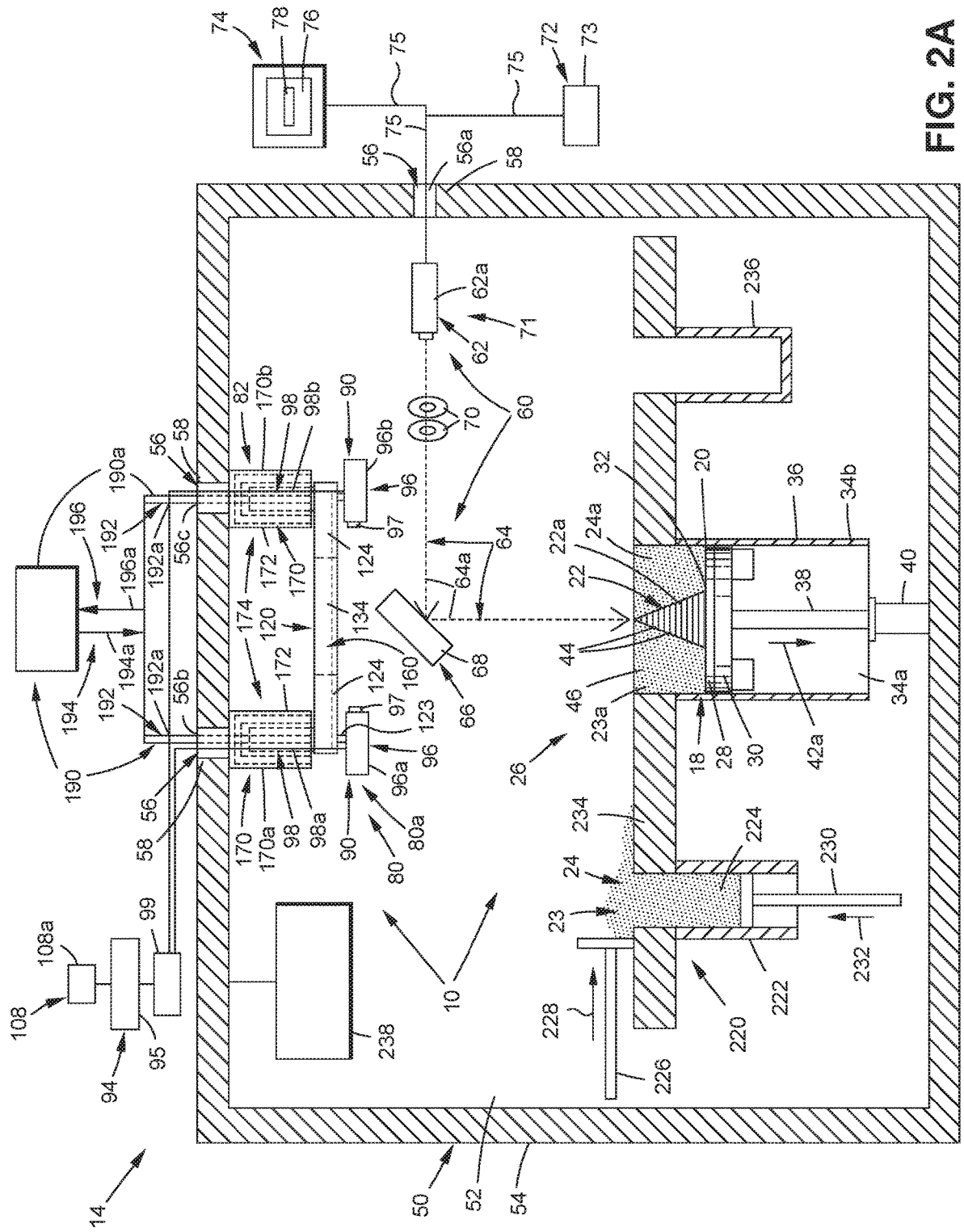
FIG. 2A is an illustration of a schematic diagram showing a front sectional view of an exemplary version of an additive manufacturing system with an exemplary version of an additive manufacturing apparatus of the disclosure, showing a part detachment assembly in a stowed position, and with laser beam delivery apparatuses in the form of laser head apparatuses.

Now referring to the Figures, FIG. 1A is an illustration of a functional block diagram showing an exemplary version of an additive manufacturing (AM) apparatus 10 of the disclosure. FIG. 1B is an illustration of a functional block diagram showing an exemplary version of an additive manufacturing (AM) system 14 of the disclosure. FIG. 2A is an illustration of a schematic diagram showing a front sectional view of an exemplary version of the AM system 14 with an exemplary version of the AM apparatus 10 of the disclosure, showing a part detachment assembly 80 in a stowed position 174, and with laser beam delivery apparatuses 90 in the form of laser head apparatuses 96.

In one version of the disclosure, there is provided the additive manufacturing (AM) apparatus 10 (see FIGS. 1A-1B, 2A) for an additive manufacturing (AM) process 12 (see FIGS. 1A-1B). The AM apparatus 10 preferably comprises a selective laser melting (SLM) AM apparatus 11 (see FIGS. 1A-1B), the AM process 12 preferably comprises a selective laser melting (SLM) AM process 13 (see FIGS. 1A-1B), and the AM system 14 (see FIG. 1B) preferably comprises a selective laser sintering (SLS) system 16 (see FIG. 1B). However, the AM apparatus 10, the AM process 12, and the AM system 14 are not limited to the SLM AM apparatus 11, the SLM AM process 13, and the SLM AM system 16, and other AM apparatuses 10, other AM processes 12, and other AM systems 16 may be used, for example, laser sintering such as direct metal laser sintering or selective laser sintering (SLS) apparatuses and processes, laser metal deposition such as direct metal deposition apparatus and process, directed light fabrication apparatus and process, laser engineered net shaping (LENS) apparatus and process, fused deposition modeling (FDM) apparatus and process, 3D printing apparatus and process, or another suitable additive manufacturing apparatus and process.

As used herein, "additive manufacturing (AM) process" means any process for manufacturing three-dimensional objects in which successive layers of material, for example, metal material, are laid down, for example, under computer control, and in which the design of the object is digitally defined by computer software, for example, computer-aided-design (CAD) software.

As shown in FIGS. 1A-1B and 2A, the AM apparatus 10 of the AM system 14 (see FIG. 1B) comprises a build assembly 18 with a build chamber 20, to support one or more parts 22, or objects, built with layers 44 (see FIG. 2A) into one or more built parts 22a, or built objects, with a build material 23, such as a powder 24, in a build operation 26 of the AM process 12. Unused build material 23a (see FIGS. 1A-1B, 2A), such as unused powder 24a (see FIGS. 1A-1B, 2A), accumulates in the build chamber 20 during the build operation 26, and needs to be removed from the build chamber 20 before additional parts 22 may be built, and needs to be removed before a cutting operation 84 (see FIGS. 1A-1B) is performed on the built parts 22a. For example, a vacuum apparatus 48 (see FIG. 1B), or another powder removal apparatus or system, may be used to remove the unused build material 23a, such as the unused powder 24a, from the build chamber 20 after the build operation 26.

Preferably, the build material 23, such as powder 24, used to build the one or more parts 22 is metal powder 24b (see FIGS. 1A-1B). The metal powder 24b may include any metal or metal alloy in powder form. As one example, metal powder 24b includes the same material as part 22. For example, the metal powder 24b may be pure material having no additional filler materials. Alternatively, the metal powder 24b may include additional filler materials. However, another suitable type of build material 23, or powder 24, may also be used.

The built parts 22a manufactured by the AM process 12 may significantly reduce the number of steps required in an assembly operation. Further, the AM process 12 may produce built parts 22a having a complex geometric structure and shape. As one example, the AM process 12 utilizing the AM apparatus 10 may produce built parts 22a having part specific features, such as, openings, fastener holes, internal lattice structures, and the like, which may substantially reduce or even eliminate the assembly steps of machining and/or installing such features in built parts 22a.

As shown in FIGS. 1A-1B and 2A, the build assembly 18 comprises a build plate 28. The one or more parts 22 are built on, and fused to, the build plate 28, directly or indirectly, to obtain one or more built parts 22a attached to the build plate 28. In one version, a base 32 (see FIGS. 1A-1B, 2A) of the built part 22a is attached, or coupled to, to the build plate 28 directly. In another version, the base 32 (see FIGS. 1A-1B, 2A) of the built part 22a may be attached or coupled indirectly to the build plate 28, via one or more support structures 33 built or formed with the build material 23, such as the powder 24, on the build plate 28, and fused to the build plate 28 with a laser assembly 60 (see FIGS. 1A-1B, 2A). The one or more support structures 33 (see FIGS. 1A-1B) may comprise one or more stilts 33a (see FIGS. 1A-1B, 2A), one or more pegs 33b (see FIGS. 1A-1B, 2A), one or more projections 33c (see FIGS. 1A-1B, 2A), or another suitable type of support structure 33 to support the one or more parts 22 on the build plate 28. The one or more support structures 33 may be used to assist in holding up overhanging portions or extending portions on the one or more parts 22 being built, and/or the one or more support structures 33 may be used to facilitate cutting or detaching of the one or more parts 22 during a cutting operation 84 (see FIGS. 1A-1B), as the one or more support structures 33 may be hollow or substantially hollow in the interior, which facilitates cutting by a cutting laser beam 92 (see FIGS. 1A-1B). Depending on the size of the part 22 to be built, one support structure 33 or multiple support structures 33 may be built on the build plate 28 to support the part 22.

As shown in FIGS. 1B and 2A, the build assembly 18 further comprises a build platform 30. The build plate 28 (see FIGS. 1B, 2A) is coupled or attached to the top of the build platform 30 (see FIGS. 1B, 2A), and the build plate 28 may be removable or detachable from the build platform 30 for removal out of the AM apparatus 10. As shown in FIG. 2A, the build chamber 20 has an interior portion 34a, an exterior portion 34b, and walls 36. Preferably, the build chamber 20 has four (4) walls 36.

The build platform 30 (see FIGS. 1B, 2A) is coupled or attached to a build piston 38 (see FIGS. 1B, 2A) positioned in the interior portion 34a of the build chamber 20. The build piston 38 raises and lowers, or is configured to raise and lower, the build platform 30. The build piston 38 is preferably coupled to a build piston actuator 40 (see FIG. 2A) that moves or actuates, or is configured to move or actuate, the build piston 38 downwardly, such as in a downward direction 42a (see FIG. 2A), as the one or more parts 22 are built with the build material 23, such as powder 24, and then upwardly in an upward direction 42b (see FIG. 2B) after the one or more parts 22 are built, or after the one or more parts 22 are built and the unused build material 23a, such as unused powder 24a, is removed from the build chamber 20.

The build platform 30 and the build piston 38 function like an elevator, and move downwardly after each layer 44 of powder 24 is added, to build the one or more parts 22 layer 44 by layer 44. The one or more parts 22 are built with the build material 23, such as powder 24, and the one or more parts 22, such as the one or more built parts 22a, may be surrounded by a powder bed 46 (see FIGS. 1B, 2A) as the one or more parts 22 are built into the built parts 22a.

As shown in FIGS. 1A-1B and 2A, the AM apparatus 10 of the AM system 14 (see FIG. 1B) preferably further comprises a housing structure 50. The housing structure 50

(see FIGS. 1A-1B, 2A) houses, or is configured to house, or contain, the build assembly 18 with the build chamber 20, to support the one or more parts 22 built with the powder 24, during the build operation 26 of the AM process 12.

As shown in FIG. 2A, the housing structure 50 has an interior 52, an exterior 54, and one or more housing openings 56. The housing openings 56 (see FIG. 2A) may comprise a first housing opening 56a (see FIG. 2A), a second housing opening 56b (see FIG. 2A), a third housing opening 56c (see FIG. 2A), a fourth housing opening 56d (see FIG. 2D), and additional housing openings 56, as needed. The housing openings 56 are formed through portions 58 (see FIGS. 2A, 2D) of the exterior 54 of the housing structure 50. Unless otherwise indicated, the terms "first," "second," "third", and "fourth", are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As shown in FIGS. 1A-1B and 2A, the AM apparatus 10 of the AM system 14 (see FIG. 1B) further comprises a laser assembly 60 that is preferably positioned at a location 71 (see FIG. 2A) above the build chamber 20 and above the one or more parts 22 being built. The housing structure 50 (see FIG. 2A) houses the laser assembly 60 (see FIG. 2A). The laser assembly 60 melts, or is configured to melt, the build material 23, such as the powder 24, in the build chamber 20 used to build the one or more parts 22, during the build operation 26.

As further shown in FIGS. 1B and 2A, the laser assembly 60 comprises a laser apparatus 62 and a scanner system 66, delivering, or configured to deliver, a laser beam 64, such as a melting laser beam 64a, to melt and fuse the build material 23, such as the powder 24, used to build the one or more parts 22 during the build operation 26. The laser apparatus 62 preferably comprises a $CO_2$ laser 62a (see FIG. 2A), or another suitable laser apparatus 62. Preferably, the laser apparatus 62 has a laser power or laser strength in a range of 100 W (one hundred watts) to 1 kW (one kilowatt). Alternatively, an electron beam (EB) apparatus that emits or generates an electron beam (EB) to melt the build material 23, such as the powder 24, in the build chamber 20 may be used. The scanner system 66 preferably comprises a scanning mirror 68 (see FIGS. 1A-1B, 2A), for example, an X-Y scanning mirror, or another suitable scanning element, and preferably further comprises one or more focus lenses 70 (see FIGS. 1A-1B, 2A).

As shown in FIGS. 1B and 2A, the AM system 14 preferably further comprises a power system 72 to power various components of the AM apparatus 10 of the AM system 14. The power system 72 is preferably coupled, or connected, via one or more connection elements 75 (see FIG. 2A), to the AM apparatus 10. The power system 72 preferably includes an electrical power source 73 (see FIGS. 1B, 2A), or another suitable power source. The connection elements 75 may comprise wired power connection elements or wireless power connection elements.

As shown in FIGS. 1B and 2A, the AM system 14 preferably further comprises a control system 74 to control various components of the AM apparatus 10 of the AM system 14. The control system 74 is preferably coupled, or connected, via one or more connection elements 75 (see FIG. 2A) to the AM apparatus 10. The control system 74 preferably includes a computer 76 (see FIGS. 1A-1B, 2A) with a software program 78 (see FIGS. 1A-1B, 2A), such as CAD (computer-aided design), 3D CAD (three-dimensional computer-aided design), or another suitable software program 78. As shown in FIG. 2A, the one or more connection elements 75 connected to the power system 72 and connected to the control system 74 may be connected to the laser apparatus 62 through a housing opening 56, such as a first housing opening 56a, formed through the exterior 54 of the housing structure 50. The AM process 12, such as the SLM AM process 13, manufactures the part 22 by melting powder 24, such as metal powder 24b (see FIG. 1B) layer 44 (see FIG. 1B) by layer 44 with the laser beam 64 (see FIGS. 1A-1B, 2A), for example, under control by the control system 74 (see FIGS. 1B, 2A) with the computer 76 (see FIGS. 1B, 2A). The AM process 12, such as the SLM AM process 13, fully melts the metal powder 24b into a solid homogeneous metal mass.

Figure 2B:
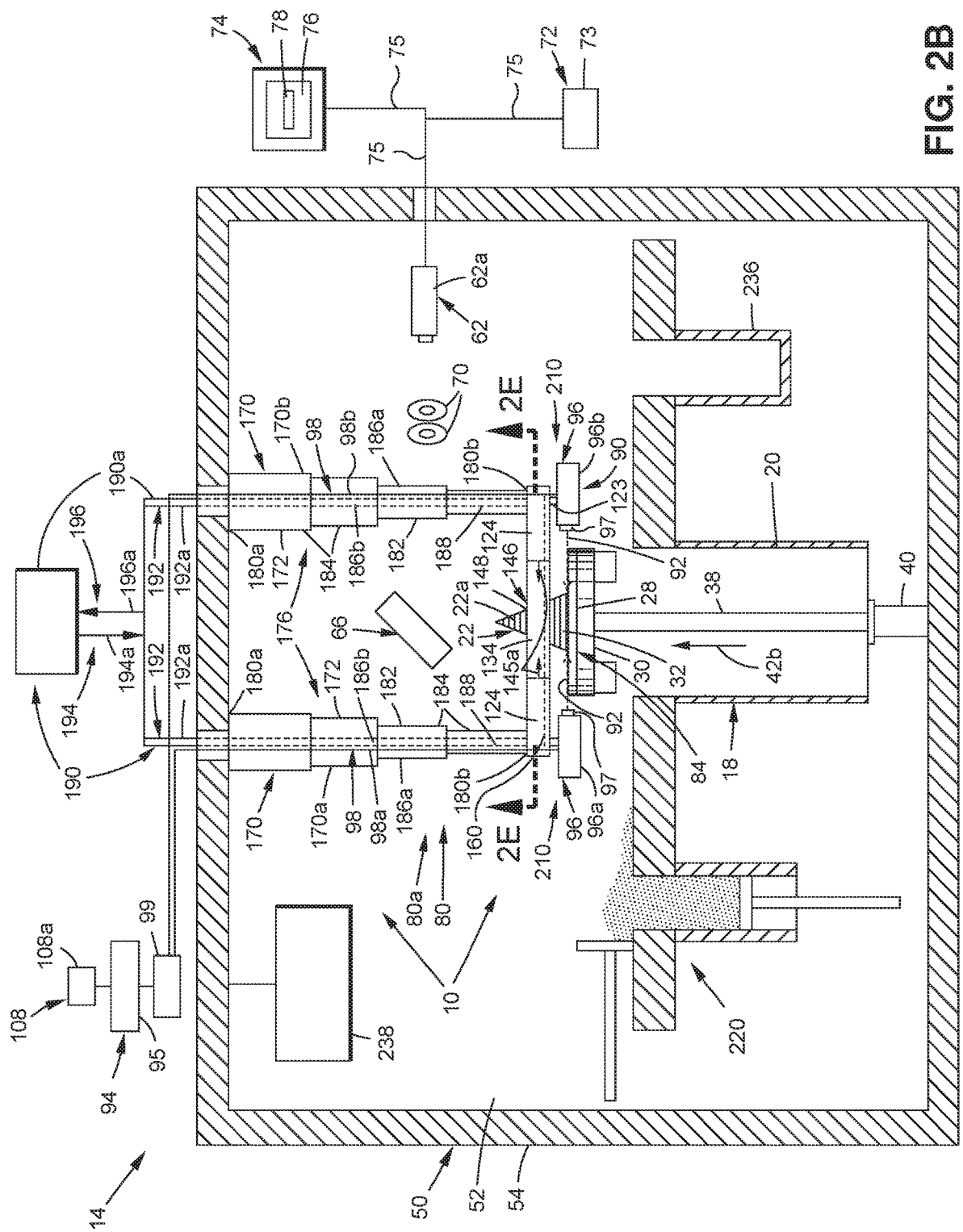
FIG. 2B is an illustration of a front sectional view of the additive manufacturing system and additive manufacturing apparatus of FIG. 2A, showing the part detachment assembly in a fully extended position and undergoing a cutting operation.
Figure 2C:
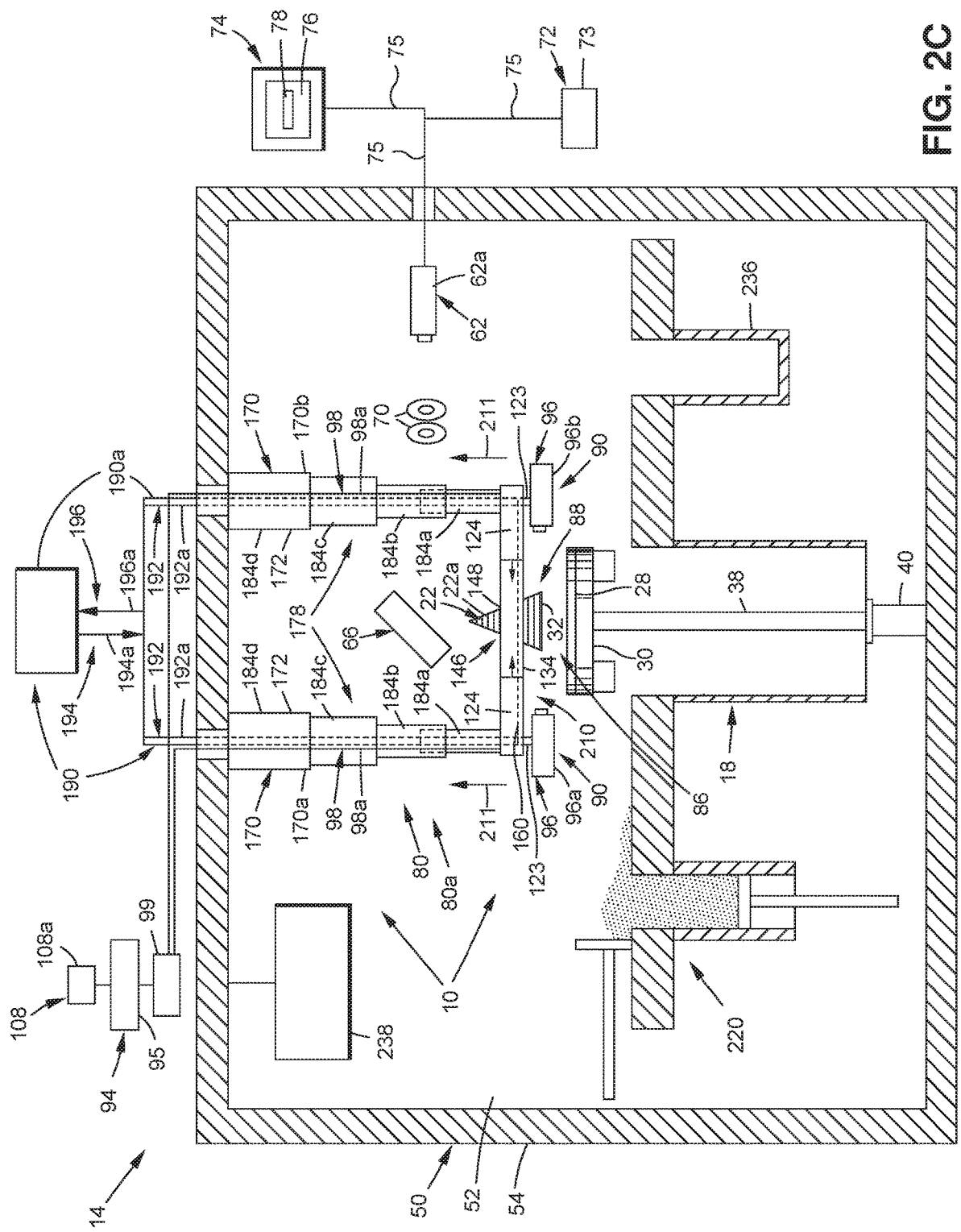
FIG. 2C is an illustration of a front sectional view of the additive manufacturing system and additive manufacturing apparatus of FIG. 2B, showing the part detachment assembly in a partially extended position and a part detached from a build plate, after undergoing a cutting operation.

The AM apparatus 10 (see FIGS. 1A-1B, 2A-2C) of the AM system 14 (see FIGS. 1B, 2A-2C) further comprises the part detachment assembly 80 (see FIGS. 1A-1B and 2A-2C). FIGS. 2A-2C show the part detachment assembly 80, such as in the form of part detachment assembly 80a. FIG. 2A shows the part detachment assembly 80, such as in the form of part detachment assembly 80a, in the stowed position 174, and with laser beam delivery apparatuses 90 in the form of laser head apparatuses 96. FIG. 2B is an illustration of a front sectional view of the AM system 14 and AM apparatus 10 of FIG. 2A showing the part detachment assembly 80, such as in the form of part detachment assembly 80a, in a fully extended position 176 and undergoing a cutting operation 84 to cut and detach the part 22, such as the built part 22a, from the build plate 28. FIG. 2C is an illustration of a front sectional view of the AM system 14 and AM apparatus 10 of FIG. 2B showing the part detachment assembly 80, such as in the form of part detachment assembly 80a, in a partially extended position 178 and showing the part 22, such as the built part 22a, detached from the build plate 28, after undergoing the cutting operation 84 (see FIG. 2B).

Figure 2D:
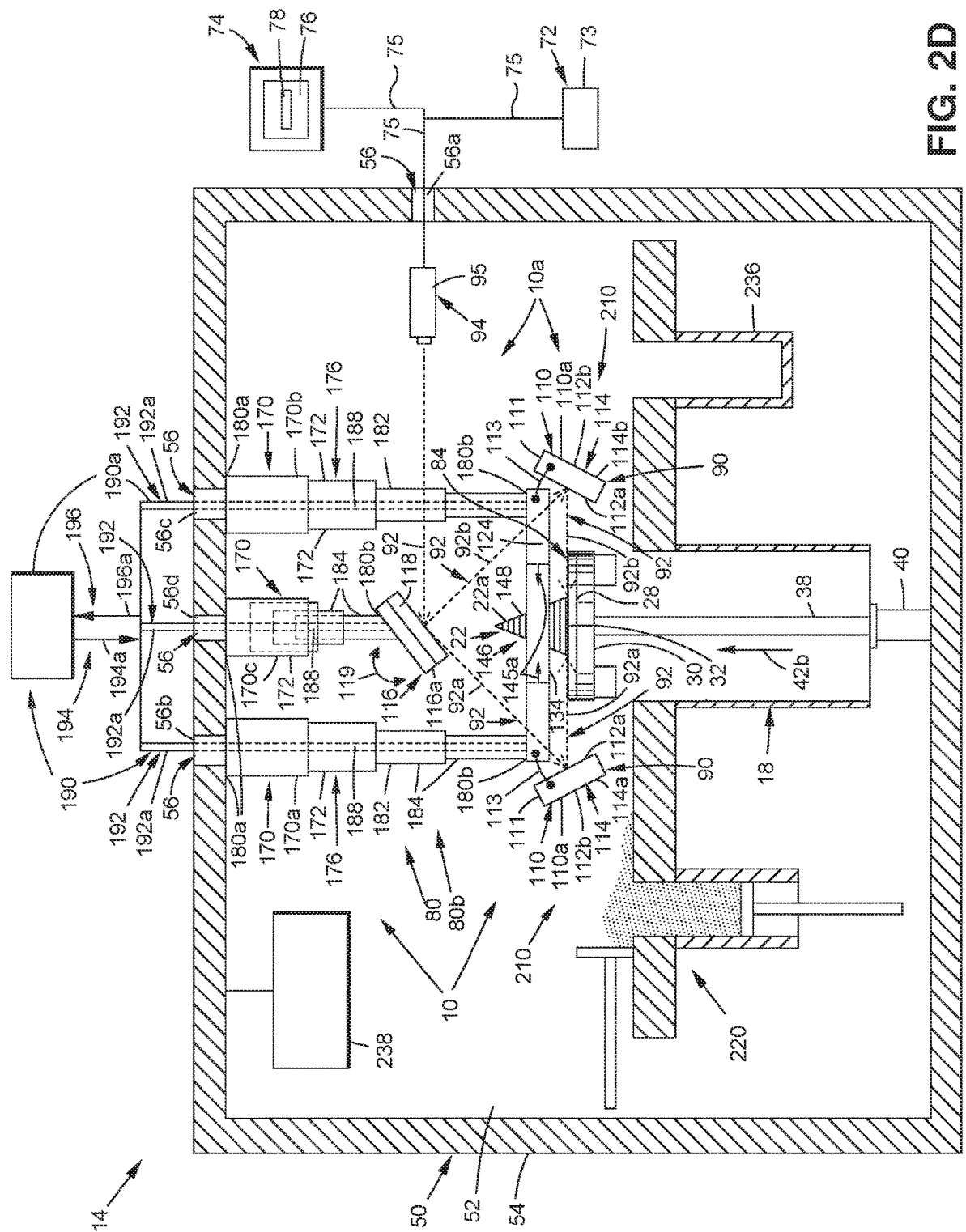
FIG. 2D is an illustration of a schematic diagram showing a front sectional view of an exemplary version of an additive manufacturing system with an exemplary version of an additive manufacturing apparatus of the disclosure, showing a part detachment assembly in a fully extended position, and with laser beam delivery apparatuses in the form of optics devices.

FIG. 2D shows the part detachment assembly 80, such as in the form of part detachment assembly 80b. FIG. 2D is an illustration of a schematic diagram showing a front sectional view of an exemplary version of the AM system 14 with an exemplary version of the AM apparatus 10 of the disclosure showing the part detachment assembly 80, such as in the form of part detachment assembly 80b, in a fully extended position 176, and with laser beam delivery apparatuses 90 in the form of optics devices 110.

As shown in FIG. 2A, the part detachment assembly 80, such as in the form of part detachment assembly 80a, is separate from the laser assembly 60 within the AM apparatus 10, and part detachment assembly 80, such as in the form of part detachment assembly 80a, is preferably positioned at a location 82 above the build chamber 20 and above the one or more parts 22, such as the one or more built parts 22a. As further shown in FIG. 2A, the part detachment assembly 80, such as in the form of part detachment assembly 80a, is in the stowed position 174, and is positioned above the laser assembly 60, when in the stowed position 174. The housing structure 50 (see FIGS. 2A-2D) houses the part detachment assembly 80 (see FIGS. 2A-2D). The part detachment assembly 80 is operable for the cutting operation 84 (see FIGS. 1A-1B, 2B) of the AM process 12.

As shown in FIGS. 1A-1B and 2A-2D, the part detachment assembly 80 comprises one or more laser beam delivery apparatuses 90. Each laser beam delivery apparatus 90 is operable to deliver, and delivers, a cutting laser beam 92 (see FIGS. 1A-1B, 2B, 2D), within the AM apparatus 10, to cut through the base 32 of each of the one or more parts 22, such as the one or more built parts 22a, to detach the one or more parts 22, such as the one or more built parts 22a, from the build plate 28, or to detach the one or more parts 22, such as the one or more built parts 22a, from one or more support structures 33 (see FIGS. 1A-1B) that may be built on the build plate 28, that project upwardly from the build plate 28, and that are positioned adjacent to, or positioned in between the base 32 of each part 22, such as each built part 22a, and the build surface of the build plate 28.

Figure 5A:
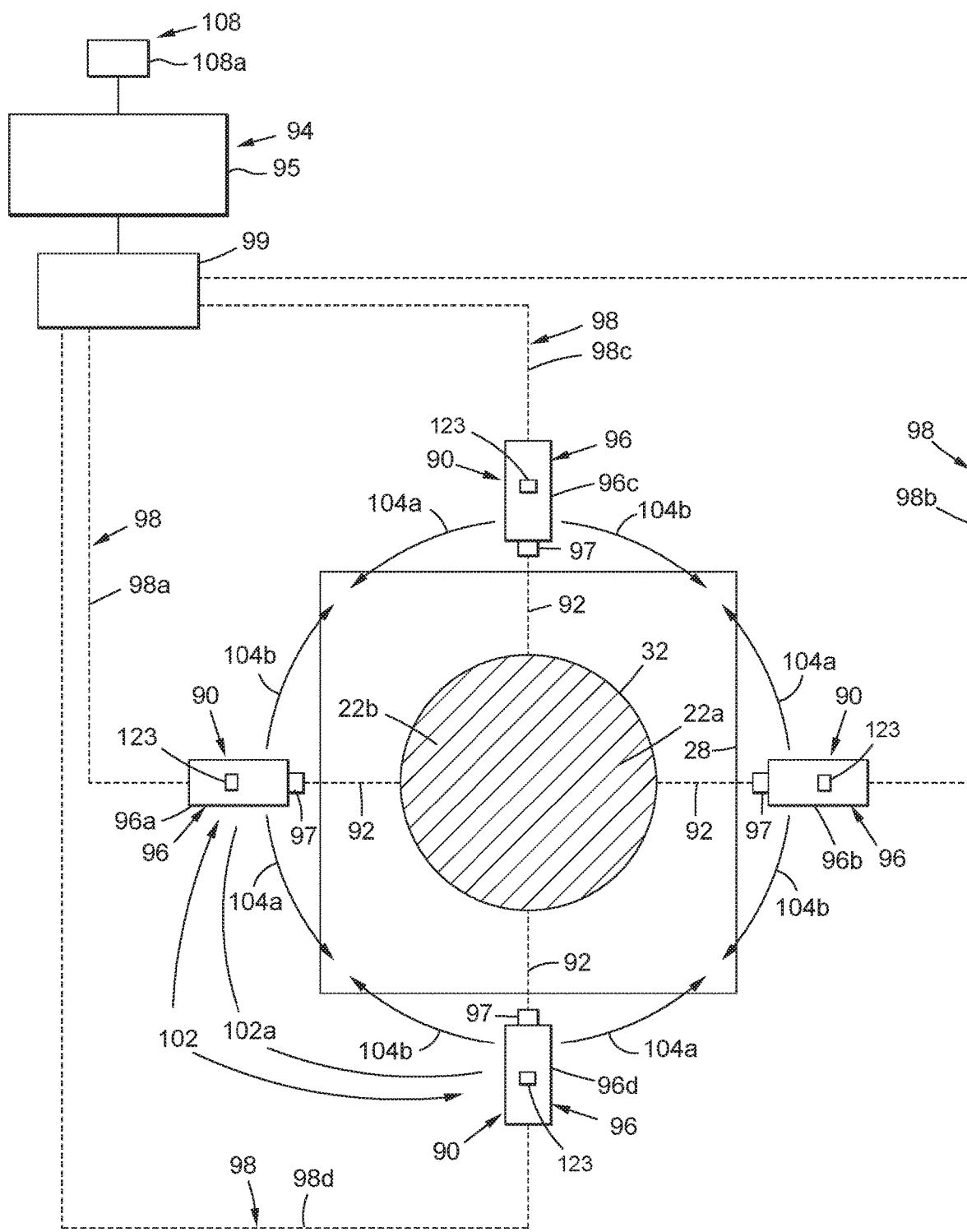
FIG. 5A is an illustration of a top schematic view of an exemplary version of laser beam delivery apparatuses delivering cutting laser beams to detach a built part from a build plate.
Figure 5B:
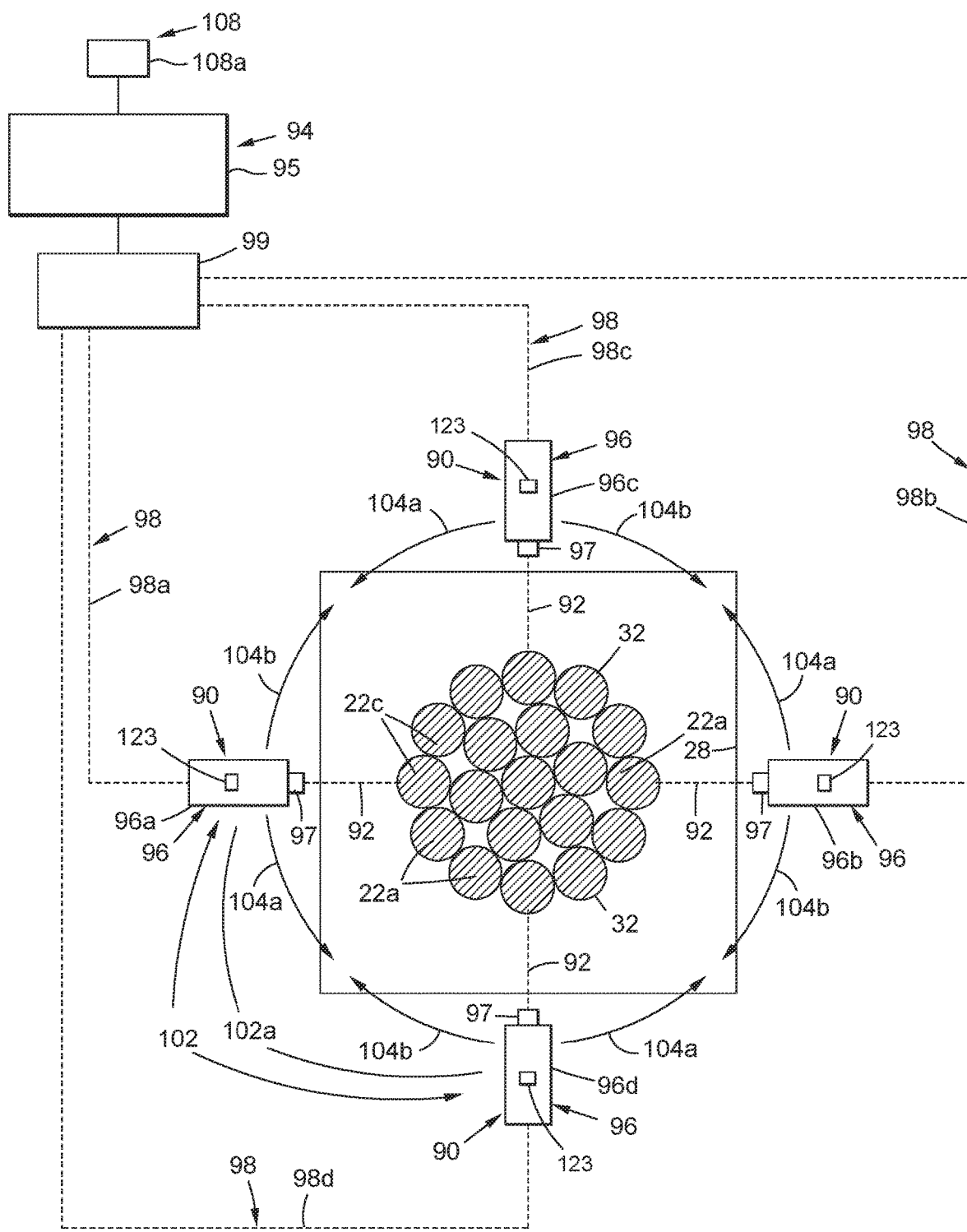
FIG. 5B is an illustration of a top schematic view of the laser beam delivery apparatuses delivering cutting laser beams of FIG. 5A to detach multiple built parts from a build plate.

In one version, as shown in FIGS. 2A-2C, the one or more laser beam delivery apparatuses 90 may comprise one or more laser head apparatuses 96, each having a laser head tip 97 (see FIGS. 2A-2B) from which the cutting laser beam 92 (see FIG. 2B) is delivered or transmitted. FIGS. 2A-2C show a first laser head apparatus 96a and a second laser head apparatus 96b. However, additional laser head apparatuses 96 may be used, such as four (4) laser beam delivery apparatuses 90, as shown in FIGS. 5A-5B, discussed in detail below. Each of the laser beam delivery apparatuses 90, such as the laser head apparatuses 96, is positioned toward, and spaced from and around, the one or more parts 22, such as the one or more built parts 22a, to be detached or cut. If there are two or more laser beam delivery apparatuses 90, each laser beam delivery apparatus 90 is in a spaced relationship 102 (see FIG. 1A) with another laser beam delivery apparatus 90.

The one or more laser head apparatuses 96 (see FIGS. 2A-2C) are preferably coupled to one or more optical fibers 98 (see FIGS. 1A-1B, 2A-2C). For example, each laser head apparatus 96 is preferably coupled to one optical fiber 98. As shown in FIGS. 2A-2C, the laser head apparatus 96, such as a first laser head apparatus 96a, is coupled to an optical fiber 98, such as a first optical fiber 98a, and the laser head apparatus 96, such as a second laser head apparatus 96b, is coupled to an optical fiber 98, such as a second optical fiber 98b. Each optical fiber 98 may be coupled directly to a laser cutting apparatus 94 (see FIGS. 1A-1B), or each optical fiber 98 (see FIGS. 2A-2C) may be coupled indirectly to the laser cutting apparatus 94 (see FIGS. 2A-2C), via an optical fiber splitter apparatus 99 (see FIGS. 1A, 2A-2C).

The laser cutting apparatus 94 (see FIGS. 1A, 2A-2C) preferably comprises a neodymium yttrium-aluminum-garnet (YAG) laser 95 (see FIGS. 2A-2C), or another suitable high power laser cutting apparatus 94. The laser cutting apparatus 94, such as the neodymium YAG laser 95, preferably has a laser power 106 (see FIG. 1A) in a range of from 6 kW (six kilowatts) to 10 kW (ten kilowatts) of power. The laser cutting apparatus 94 (see FIGS. 1A, 2A-2C) is powered by a laser power source 108 (see FIGS. 1A, 2A-2C), such as an electrical power source 108a (see FIGS. 2A-2C), or another suitable laser power source 108.

In another version, as shown in FIGS. 1A-1B and 2D, the one or more laser beam delivery apparatuses 90 comprise one or more optics devices 110. The one or more optics devices 110 preferably comprise one or more mirrors 111 (see FIGS. 1A, 2D), or another suitable optics device 110. FIG. 2D shows a first optics device 110a and a second optics device 110b. However, additional optics devices 110 may be used.

In one example, the one or more laser beam delivery apparatuses 90 may comprise four (4) laser beam delivery apparatuses 90 comprising four (4) optics devices 110, such as in the form of mirrors 111, positioned toward, and spaced around, the one or more parts 22, such as the one or more built parts 22a, to be detached or cut. Each of the four (4) optics devices 110, such as mirrors 111, may be in a spaced relationship 102 (see FIG. 1A), such as a 90° (ninety degree) spaced relationship 102a (see FIG. 1A), spaced 90° (ninety degrees) apart from each other. In another example, the one or more laser beam delivery apparatuses 90 may comprise two (2) laser beam delivery apparatuses 90 comprising two (2) optics devices 110, such as in the form of mirrors 111, positioned toward, and spaced around, the one or more parts 22, such as the one or more built parts 22a, to be detached or cut. Each of the two (2) optics devices 110 may be in a spaced relationship 102 (see FIG. 1A), such as a 180° (one-hundred eighty degree) spaced relationship 102b (see FIG. 1A), and spaced 180° (one-hundred eighty degrees) apart from each other.

As shown in FIG. 2D, each optics device 110, such as in the form of mirrors 111, has a first side 112a and a second side 112b, and each may be coupled to a part holder apparatus 120, via an attachment element 113, such as a bolt and hinge apparatus or another suitable type of attachment element 113. As shown in FIG. 2D, each optics device 110 is maneuverable to be positioned at an angled position 114. For example, the first optics device 110a is shown in a first angled position 114a (see FIG. 2D), and the second optics device 110b is shown in a second angled position 114b (see FIG. 2D).

Each of the one or more optics devices 110 is preferably angled relative to one or more incident angles 115 (see FIG. 1A) of a laser beam splitter device 116 (see FIGS. 1A-1B, 2D) positioned above the one or more optics devices 110. The laser beam splitter device 116 is preferably angled to receive the cutting laser beam 92 (see FIG. 2D) from a laser cutting apparatus 94 (see FIG. 2D), such as a neodymium YAG laser 95 (see FIG. 2D), and is angled to transmit the cutting laser beam 92 to the first side 112a of each of the one or more optics devices 110. As shown in FIG. 2D, the laser cutting apparatus 94 transmits the cutting laser beam 92 to the laser beam splitter device 116. As further shown in FIG. 2D, the laser beam splitter device 116 splits the cutting laser beam 92 into a first split cutting laser beam 92a reflected off the first side 112a of the first optics device 110a, and into a second split cutting laser beam 92b reflected off the second side 112b of the second optics device 110b, where both the first split cutting laser beam 92a and the second split cutting laser beam 92b cut through the base 32 of the part 22, such as the built part 22a, to detach the part 22, such as the built part 22a, from the build plate 28.

The laser beam splitter device 116 (see FIGS. 1A-1B, 2D) may comprise a cube beam splitter 116a (see FIGS. 1A, 2D), a plate beam splitter 116b (see FIG. 1A), or another suitable type of laser beam splitter device 116. As shown in FIG. 2D, the laser beam splitter device 116 may be coupled or connected to an electric turntable apparatus 118, which enables the laser beam splitter device 116 to rotate or move in a rotating direction 119. The laser beam splitter device 116 is preferably connected to the electric turntable apparatus 118 or to another suitable rotating apparatus that is configured to rotate the laser beam splitter device 116. During the cutting operation 84 (see FIGS. 1A-1B, 2D), the laser beam splitter device 116 rotates, or is operable to rotate, via the electric turntable apparatus 118, in unison with the optics devices 110, such as the mirrors 111, as the optics devices 110 are simultaneously rotated about a center 121 (see FIGS. 1A, 2F) of the part holder apparatus 120 (see FIGS. 1A-1B, 2D), by an electromagnetic actuation system 160 (see FIGS. 1A-1B, 3A-3B), discussed in further detail below.

As shown in FIGS. 1A-1B and 2A-2D, the part detachment assembly 80 further comprises the part holder apparatus 120 coupled to the one or more laser beam delivery apparatuses 90, via one or more connecting members 123

(see FIGS. 2A-2D), such as one or more bolts, screws, posts, or another suitable connecting member 123. As shown in FIGS. 1A and 2A-2D, the part holder apparatus 120 comprises an outer stationary portion 124 and an inner movable portion 134. The outer stationary portion 124 may be made of a metal material, such as stainless steel, or another suitable metal material, or may be made be made of a rigid plastic material. As shown in FIG. 1A, the inner movable portion 134 is preferably made of a deformable material 136. The deformable material 136 may comprise a foam material 136a (see FIG. 1A), for example, a polyurethane foam, a polyethylene foam, a viscoelastic foam, or another suitable foam material 136a, or the deformable material 136 may comprise a rubber material 136b (see FIG. 1A), or another suitable deformable material 136.

The inner movable portion 134 is movable and may be actuated with a plurality of pistons 150 (see FIG. 1A) coupled to the inner movable portion 134. As shown in FIG. 1A, the plurality of pistons 150 may comprise a plurality of pneumatic air pistons 150a, a plurality of hydraulic pistons 150b, or another suitable type of piston 150. The plurality of pistons 150 are preferably actuated via an actuation system 190 (see FIGS. 1B, 2A-2D) coupled to the AM apparatus 10. As shown in FIG. 1B, the actuation system 190 may comprise a pneumatic actuation system 190a, a hydraulic actuation system 190b, or another suitable type of actuation system 190. The actuation system 190 is discussed in detail below with respect to FIG. 4.

As shown in FIG. 1A, the part holder apparatus 120 has a center 121 and a geometric configuration 122. The geometric configuration 122 may comprise a ring configuration 122a (see FIGS. 1A, 2E), a square configuration 122b (see FIG. 1A), a triangle configuration 122c (see FIG. 1A), a rectangle configuration 122d (see FIG. 1A), or another suitable geometric configuration 122. The part holder apparatus 120 is discussed in further detail below with respect to FIGS. 2E and 2F.

As shown in FIGS. 1A-1B and 2A-2D, the part detachment assembly 80 further comprises an electromagnetic actuation system 160 coupled to the part holder apparatus 120 and coupled to the one or more laser beam delivery apparatuses 90. The electromagnetic actuation system 160 is operable to rotate or move the one or more laser beam delivery apparatuses 90 (see FIGS. 1A-1B, 2A-2D) about the center 121 (see FIG. 1A, 2F) of the part holder apparatus 120 (see FIGS. 1A-1B, 2A-2D) during the cutting operation 84 (see FIGS. 1A-1B, 2B, 2D). The electromagnetic actuation system 160 is discussed in further detail below with respect to FIGS. 3A and 3B.

As shown in FIGS. 1A-1B and 2A, the part detachment assembly 80 may further comprise two or more telescoping structures 170 coupled to the housing structure 50, and further coupled to the part holder apparatus 120. Each of the two or more telescoping structures 170 has a telescoping configuration 172 (see FIGS. 1A, 2A-2D). As shown in FIGS. 2A-2D, the telescoping structures 170 comprise a first telescoping structure 170a and a second telescoping structure 170b, each coupled at a first end 180a (see FIGS. 2B, 2D) to the housing structure 50 (see FIGS. 2B, 2D), and each coupled at a second end 180b (see FIGS. 2B, 2D) to the part holder apparatus 120 (see FIGS. 2B, 2D). As shown in FIG. 2D, the telescoping structure 170 may further comprise a third telescoping structure 170c coupled at a first end 180a to the housing structure 50, and coupled at the second end 180b to the laser beam splitter device 116.

Each of the two or more telescoping structures 170 has a body 182 (see FIGS. 2B, 2D) comprising a plurality of cylindrical telescoping portions 184 (see FIGS. 2B-2D). As shown in FIG. 2C, the plurality of cylindrical telescoping portions 184 may comprise a first cylindrical telescoping portion 184a, a second cylindrical telescoping portion 184b, a third cylindrical telescoping portion 184c, and a fourth cylindrical telescoping portion 184d. The plurality of cylindrical telescoping portions 184 may comprise more than four cylindrical telescoping portions 184, or may comprise two or three cylindrical telescoping portions 184. As shown in FIG. 2B, each of the two or more telescoping structures 170 further has an exterior 186a, an interior 186b, and an interior channel 188 (see also FIG. 2D) formed through the length of the interior 186b of the telescoping structure 170. The optical fibers 98 (see FIGS. 2A-2C) coupling the laser beam delivery apparatuses 90 (see FIGS. 2A-2C) to the optical fiber splitter apparatus 99 may be inserted through the interior channel 188 of each telescoping structure 170. Each telescoping structure 170 may have one or more seals 208 (see FIG. 1A) along the interior channel 188 and/or located at other portions of the telescoping structure 170 to prevent leakage or release of any fluid 198 (see FIG. 4), such as compressed air 198a (see FIG. 4), or hydraulic fluid 198b (see FIG. 4), out into the interior 52 (see FIG. 2A) of the housing structure 50 (see FIG. 2A), during actuation or deployment of each telescoping structure 170, and during retraction or stowage of each telescoping structure 170. The one or more seals 208 may comprise a thermoplastic material, such as a polychlorotrifluoroethylene thermoplastic, or may comprise neoprene, or another suitable seal material.

As shown in FIG. 2A, during the build operation 26, the part detachment assembly 80, such as including each telescoping structure 170, is in the stowed position 174, and the laser assembly 60 delivers the laser beam 64, such as the melting laser beam 64a, to melt and fuse the build material 23, such as powder 24, to build the part 22 attached to the build plate 28, directly or indirectly. Once the part 22 is built, and the built part 22a (see FIG. 2A) is obtained, and once the unused build material 23a (see FIG. 2A), such as the unused powder 24a (see FIG. 2A) is removed from the build chamber 20 and the build platform 30, the part detachment assembly 80 may be deployed and the cutting operation 84 may be performed.

As shown in FIG. 2B, the part detachment assembly 80, which may include each telescoping structure 170, is operable to move, after the build operation 26, from the stowed position 174 (see FIG. 2A) to a fully extended position 176, for the cutting operation 84, and to position the part holder apparatus 120 and the one or more laser beam delivery apparatuses 90 at a position 210 adjacent to, and aligned with, the one or more parts 22, such as the one or more built parts 22a. The telescoping structures 170 (see FIG. 2B) actuate downwardly to the one or more parts 22, such as the one or more built parts 22a, and actuate a predetermined distance 189 (see FIG. 1B) for each part 22 that is built. The telescoping structures 170 (see FIG. 2B) may actuate downwardly via the actuation system 190 (see FIG. 2B). A fluid 198 (see FIG. 4), such as compressed air 198a (see FIG. 4), hydraulic fluid 198b (see FIG. 4), or another suitable fluid 198, flows from the actuation system 190 (see FIGS. 2B, 4) through an input line 194 (see FIGS. 2A-2D, 4), such as a pneumatic input line 194a (see FIGS. 2A-2D, 4) or a hydraulic input line 194b (see FIG. 4), to move or actuate the telescoping structure 170 (see FIGS. 2A-2D, 4). In one version, each telescoping structure 170 may be pushed or moved downwardly, in unison, with the fluid 198, and each telescoping structure 170 may be pulled or moved back up, in unison, with a pump apparatus 200 (see FIG. 4), such as a vacuum pump 200a (see FIG. 4). In another version, each telescoping structure 170 is actuated downwardly via the fluid 198 actuating an actuator 192, which is coupled to the telescoping structure 170, and which, in turn, actuates the telescoping structure 170. Preferably, the two or more telescoping structures 170 are actuated in unison. Each telescoping, structure 170 is pulled or moved back up, in unison, with the pump apparatus 200 (see FIG. 4), such as the vacuum pump 200a (see FIG. 4).

The two or more telescoping structures 170 are moved downward from the stowed position 174 to the fully extended position 176, and are moved upward from the fully extended position 176 to the stowed position 174, via the actuation system 190. As shown in FIG. 1B, the actuation system 190 may comprise a pneumatic actuation system 190a, a hydraulic actuation system 190b, or another suitable actuation system mechanism or device.

Once the telescoping structures 170 reach the predetermined distance 189 at the position 210 (see FIG. 2B) adjacent the one or more parts 22, such as the one or more built parts 22a, and the part detachment assembly 80 is at the fully extended position 176 (see FIG. 2B), the interior channel 188 of each telescoping structure 170 allows the fluid 198 (see FIG. 4), such as compressed air 198a (see FIG. 4), hydraulic fluid 198b (see FIG. 4), or another suitable fluid 198, to flow as inflow 157a (see FIG. 2E) through a part holder apparatus input line 158a (see FIGS. 2E, 4) to actuate the plurality of pistons 150 (see FIGS. 1A, 2E), which move the inner movable portion 134 (see FIGS. 2B, 2E) inward to compress against one or more of the one or more parts 22, such as the one or more built parts 22a, to hold in place the one or more parts 22, such as the one or more built parts 22a. As shown in FIG. 2B, the inner movable portion 134 is moved inwardly in an inward direction 145a to an actuated position 146, and an outer portion 148 of the one or more parts 22, such as the one or more built parts 22a, is held in place by the inner movable portion 134 in the actuated position 146.

Once the one or more parts 22, such as the one or more built parts 22a, is/are held in place by the inner movable portion 134 of the part holder apparatus 120, the laser cutting apparatus 94 (see FIG. 2B) may be turned on, and a cutting laser beam 92 (see FIG. 2B) is delivered to each laser beam delivery apparatus 90 (see FIG. 2B), such as the laser head apparatus 96 (see FIG. 2B), to perform the cutting operation 84 (see FIG. 2B). As shown in FIG. 2B, during the cutting operation 84, the part holder apparatus 120 holds the one or more parts 22, such as the one or more built parts 22a, and each of the one or more laser beam delivery apparatuses 90 delivers the cutting laser beam 92 to cut through the base 32 of each of the one or more parts 22, such as the one or more built parts 22a, to detach the one or more parts 22, such as the one or more built parts 22a, from the build plate 28 within the AM apparatus 10. Alternatively, the one or more laser beam delivery apparatuses 90 delivers the cutting laser beam 92 to cut through the base 32 of each of the one or more parts 22, such as the one or more built parts 22a, to detach the one or more parts 22, such as the one or more built parts 22a, from one or more support structures 33 (see FIGS. 1A-1B), such as in the form of stilts 33a, pegs 33b, projections 33c, or another suitable support structure 33, built on the build plate 28 within the AM apparatus 10.

Figure 2F:
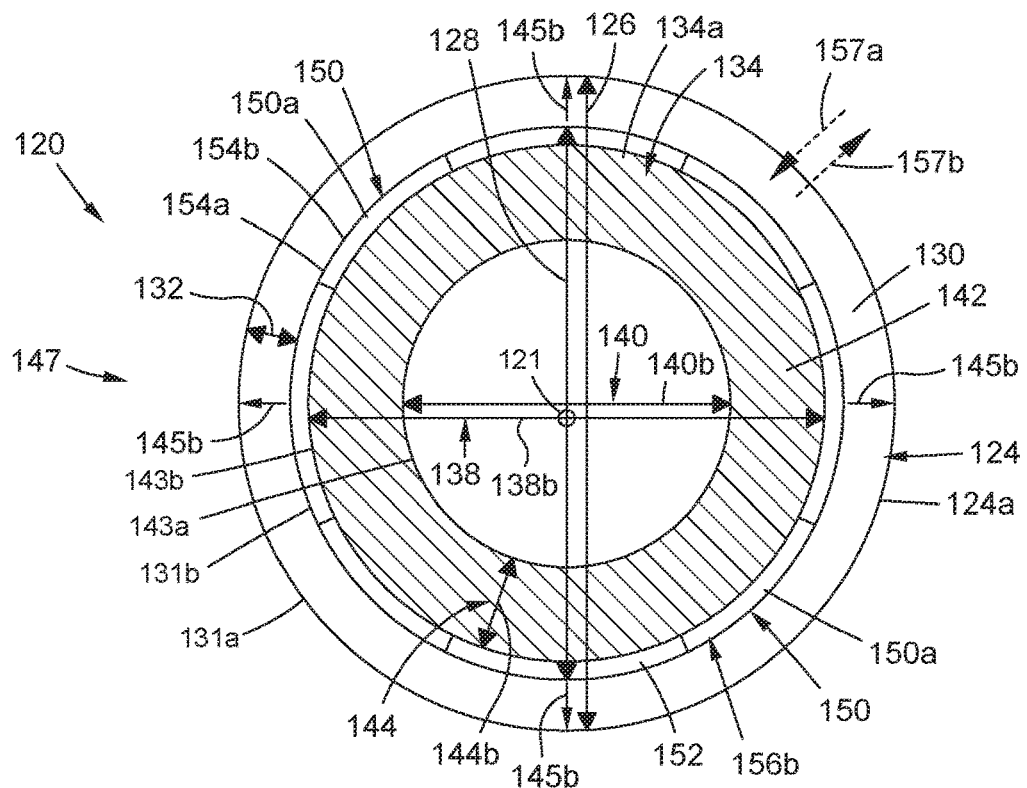
FIG. 2F is an illustration of the enlarged cross-sectional view of the part holder apparatus of FIG. 2E, showing the part holder apparatus in a stowed position with the built part removed.
Figure 3A:
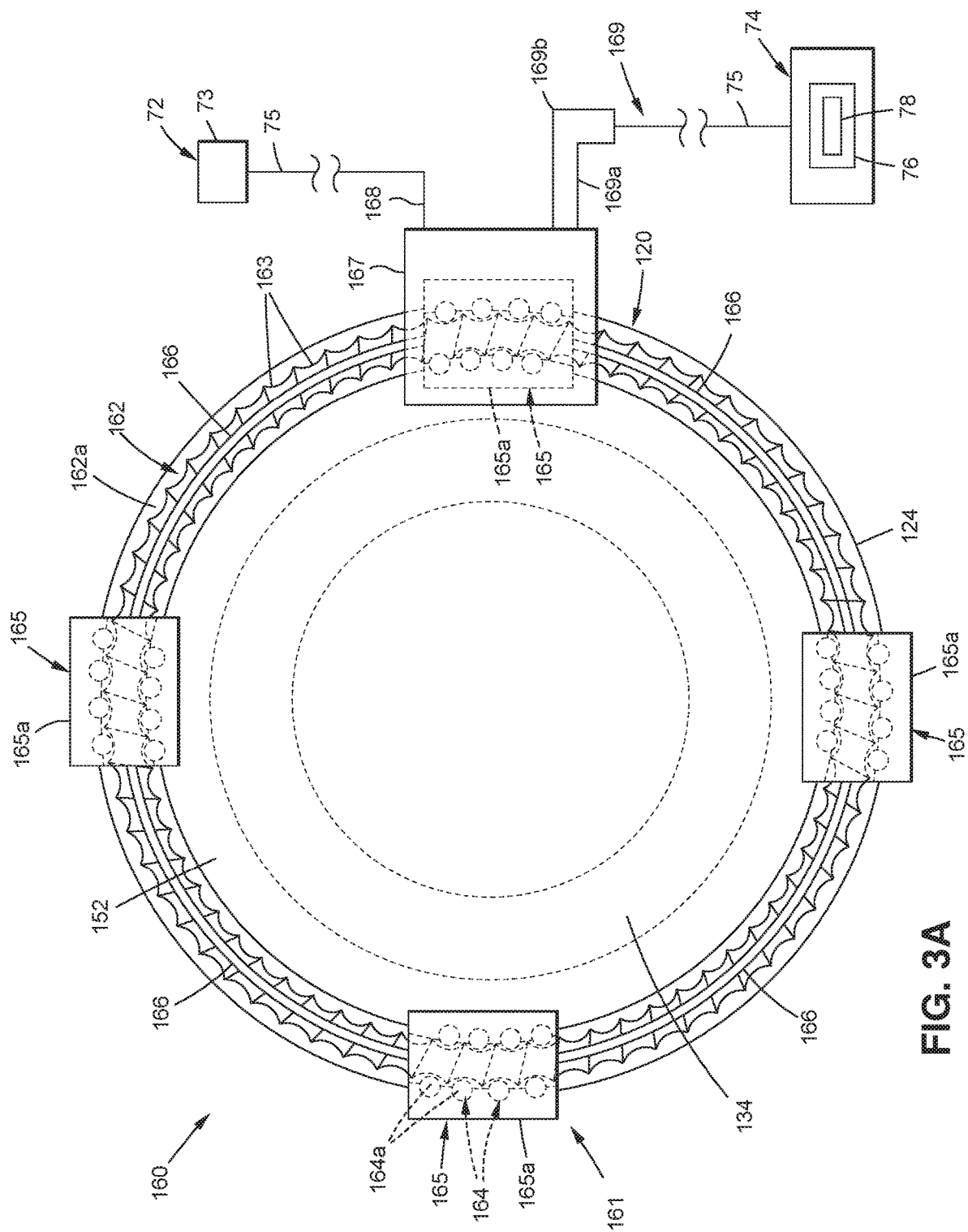
FIG. 3A is an illustration of a top sectional view of an exemplary version of an electromagnetic actuation system that may be used with a version of the additive manufacturing apparatus and additive manufacturing system of the disclosure.
Figure 3B:
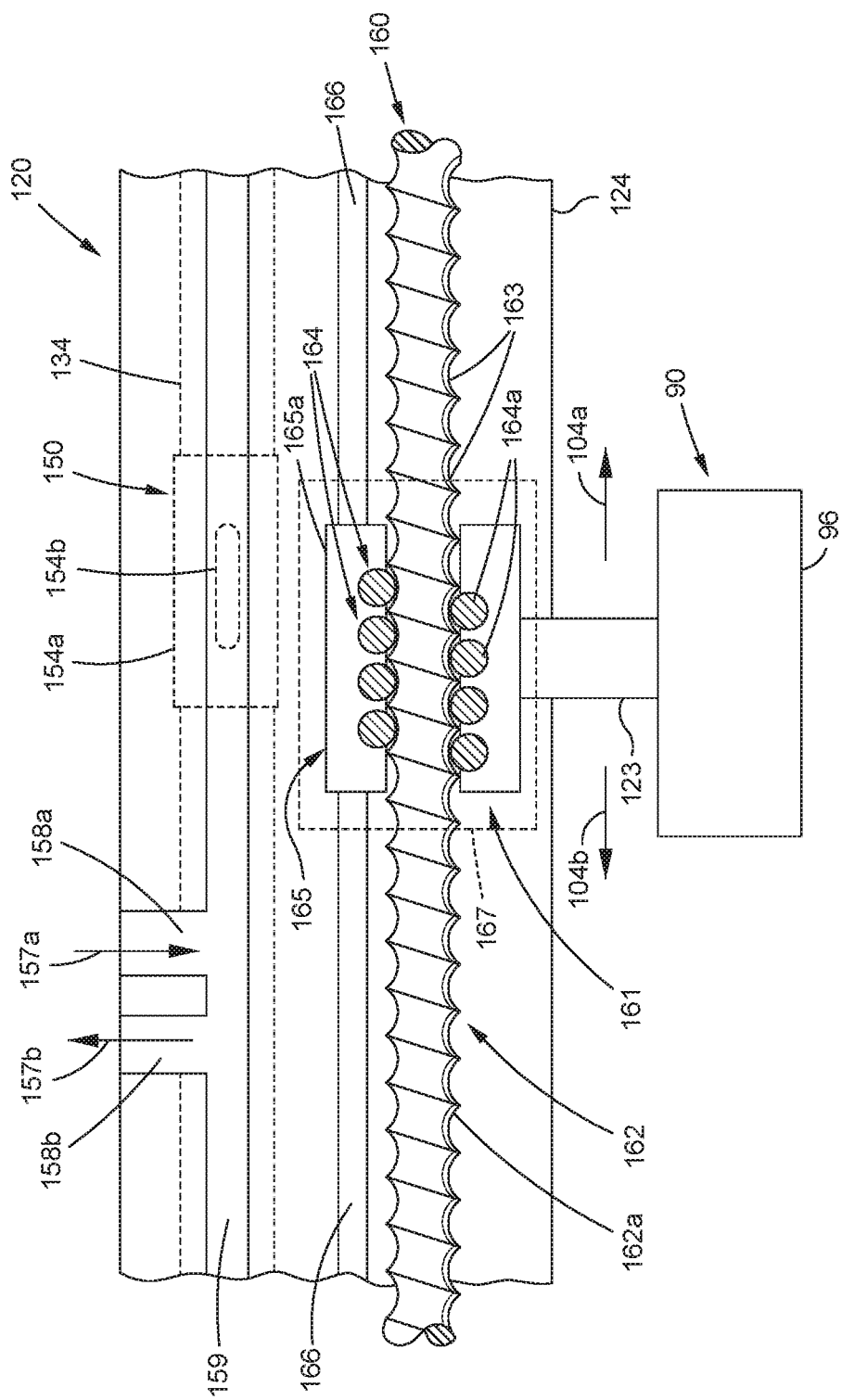
FIG. 3B is an illustration of an enlarged left side partial sectional view of the electromagnetic actuation system of FIG. 3A, attached to a part holder apparatus and attached to a laser beam delivery apparatus.

During the cutting operation 84, each of the laser beam delivery apparatuses 90 (see FIG. 2B), such as the laser head apparatuses 96 (see FIG. 2B), is preferably rotated or moved about the center 121 (see FIGS. 1A, 2F) of the part holder apparatus 120 (see FIGS. 2B, 2F), with the electromagnetic actuation system 160 (see FIGS. 2B, 3A-3B). Further, during the cutting operation 84, only the laser cutting apparatus 94 is powered on, and the laser assembly 60 is powered off.

The part detachment assembly 80 (see FIGS. 1A-1B, 2B) provides for an automated detachment 212 (see FIGS. 1A-1B) of the one or more parts 22, such as the one or more built parts 22a, from the build plate 28, to avoid, prior to the cutting operation 84, a manual removal 218 (see FIGS. 1A-1B) of the build plate 28 with the attached one or more parts 22, such as the one or more built parts 22a, from the AM apparatus 10, and to avoid a mechanical detachment 214 (see FIGS. 1A-1B) of the one or more parts 22, such as the one or more built parts 22a, from the build plate 28, outside of the AM apparatus 10.

Moreover, the part detachment assembly 80 (see FIGS. 1A-1B, 2C) provides for an automated removal 216 (see FIGS. 1A-1B) of the one or more parts 22, such as the one or more built parts 22a, from the build plate 28. As shown in FIG. 2C, the part detachment assembly 80, including the telescoping structures 170, is in a partially extended position 178, where the telescoping structures 170 are retracting back toward the stowed position 174 (see FIG. 2A). FIG. 2C shows a removal operation 86 with the inner movable portion 134 in the actuated position 146 holding the outer portion 148 of the part 22, such as the built part 22a, that has been detached from the build plate 28 after the cutting operation 84 (see FIG. 2B), as the telescoping structures 170 retract upwardly. A user may access the interior 52 of the housing structure 50 of the AM apparatus 10 and retrieve the part 22, such as the built part 22a, from the part holder apparatus 120. Alternatively, the inner movable portion 134 may retract back to the stowed position 147 (see FIG. 2F) and may release the part 22, such as the built part 22a, that has been detached from the build plate 28 back onto the build plate 28, and a user may access the interior 52 of the housing structure 50 of the AM apparatus 10 and retrieve the part 22, such as the built part 22a, from the build plate 28.

As shown in FIGS. 1B and 2A, the AM system 14 having the AM apparatus 10 may further comprise a powder delivery assembly 220 to supply the build material 23, such as powder 24, to the build assembly 18. As further shown in FIGS. 1B and 2A, the powder delivery assembly 220 comprises a powder reservoir 222 containing a powder feed supply 224 of powder 24. The powder delivery assembly 220 may further comprise a powder leveling apparatus 226 (see FIGS. 1B, 2A), such as in the form of a roller apparatus, a rake apparatus, or another suitable leveling apparatus, to deliver or feed the build material 23, such as the powder 24, in a horizontal powder feed direction 228 (see FIG. 2A), across a powder supply platform 234 (see FIG. 2A) to the build chamber 20. As shown in FIG. 2A, the powder delivery assembly 220 may further comprise a powder supply piston 230 that moves in an upward powder supply direction 232 to move the build material 23, such as the powder 24, up to the powder supply platform 234. The powder supply piston 230 moves upwardly and downwardly as needed.

As shown in FIGS. 1B and 2A, the AM system 14 may preferably further comprise a powder overflow chamber 236, to store any build material 23, such as powder 24, that overflows from the build chamber 20 into the powder overflow chamber 236. As shown in FIG. 2A, the powder overflow chamber 236 is housed or contained within the interior 52 of the housing structure 50.

As shown in FIGS. 1B and 2A, the AM system 14 may preferably further comprises an environmental control assembly 238. As shown in FIG. 2A, the environmental control assembly 238 may also be housed or contained within the interior 52 of the housing structure 50. The environmental control assembly 238 may control the temperature within the AM apparatus 10, and in particular, in the build chamber 20, and on the build platform 30 and powder bed 46. Further, the environmental control assembly 238 may maintain a level of oxygen within the AM apparatus 10, and in particular, in the build chamber 20, within a selected level. In addition, the environmental control assembly 238 may control the vacuum level of a pump apparatus 200 (see FIG. 4), such as a vacuum pump 200a (see FIG. 4), of the actuation system 190 (see FIG. 4).

As shown in FIG. 2A, the housing structure 50 of the AM apparatus 10 of the AM system 14 houses or contains the build assembly 18, the build chamber 20, the laser assembly 60, the part detachment assembly 80, the powder delivery assembly 220, the powder overflow chamber 236, and the environmental control assembly 238.

As shown in FIGS. 1B and 2A, the AM system 14 may further comprise the actuation system 190 coupled to the AM apparatus 10, to actuate the part detachment assembly 80. As further shown in FIGS. 1B and 2A, the AM system 14 further comprises the power system 72 coupled to the AM apparatus 10, to power the AM apparatus 10. As further shown in FIGS. 1B and 2A, the AM system 14 may further comprise the control system 74 coupled to the AM apparatus 10, to control the AM apparatus 10.

Figure 2E:
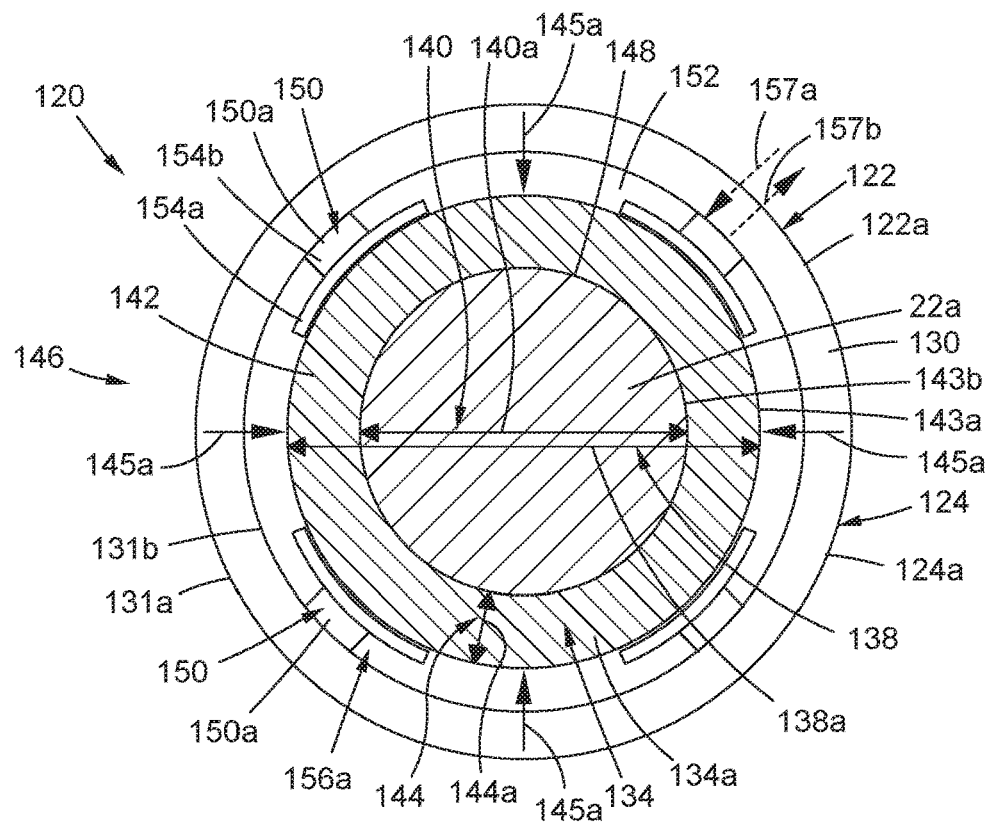
FIG. 2E is an illustration of an enlarged cross-sectional view, taken along lines 2E-2E of FIG. 2B, of an exemplary version of a part holder apparatus in an actuated position holding a built part.

Now referring to FIGS. 2E and 2F, FIG. 2E is an illustration of an enlarged cross-sectional view, taken along lines 2E-2E of FIG. 2B, of an exemplary version of the part holder apparatus 120 in an actuated position 146 holding the outer portion 148 of the built part 22a. FIG. 2F is an illustration of the enlarged cross-sectional view of the part holder apparatus 120 of FIG. 2E, showing the part holder apparatus 120 in a stowed position 147 with the built part 22a (see FIG. 2E), removed. The part holder apparatus 120 (see FIGS. 2E, 2F) has a center 121 (see FIG. 2F) and a geometric configuration 122 (see FIG. 2E), such as a ring configuration 122a (see FIG. 2E). However, as discussed above, the part holder apparatus 120 may have another suitable geometric configuration 122.

As shown in FIGS. 2E and 2F, the part holder apparatus 120 comprises an outer stationary portion 124 that is stationary and does not move. The outer stationary portion 124 (see FIGS. 2E, 2F) may be in the form of an outer stationary ring 124a (see FIGS. 2E, 2F), or another suitable configuration. The outer stationary portion 124, such as the outer stationary ring 124a, has an outer diameter 126 (see FIG. 2F), an inner diameter 128 (see FIG. 2F), and a body 130 (see FIGS. 2E, 2F) having an outer side 131a (see FIGS. 2E, 2F), an inner side 131b (see FIGS. 2E, 2F), and a width 132 (see FIG. 2F). The outer stationary portion 124 may be made of a metal material, such as stainless steel, or another suitable metal material, or may be made of a rigid plastic material.

As shown in FIGS. 2E and 2F, the part holder apparatus 120 further comprises an inner movable portion 134. The inner movable portion 134 (see FIGS. 2E, 2F) may be in the form of an inner movable ring 134a (see FIGS. 2E, 2F), or another suitable configuration. As discussed above, the inner movable portion 134 is preferably made of a deformable material 136 (see FIG. 1A) that may comprise a foam material 136a (see FIG. 1A), for example, a polyurethane foam, a polyethylene foam, a viscoelastic foam, or another suitable foam material 136a, or that may comprise a rubber material 136b (see FIG. 1A), or another suitable deformable material 136.

As shown in FIGS. 2E and 2F, the inner movable portion 134, such as the inner movable ring 134a, has an outer diameter 138, an inner diameter 140, and a body 142 having an outer side 143a, an inner side 143b, and a width 144. As shown in FIG. 2E, when the part holder apparatus 120 is in the actuated position 146, the outer diameter 138 comprises a first outer diameter 138a, the inner diameter 140 comprises a first inner diameter 140a, and the body 142 comprises a first width 144a. As shown in FIG. 2F, when the part holder apparatus 120 is in the stowed position 147, the outer diameter 138 comprises a second outer diameter 138b, the inner diameter 140 comprises a second inner diameter 140b, and the body 142 comprises a second width 144b. The second width 144b (see FIG. 2F) of the inner movable portion 134 is greater than the first width 144a (see FIG. 2E) of the inner movable portion 134, when the part holder apparatus 120 is in the stowed position 147 (see FIG. 2F), as compared to the part holder apparatus 120 in the actuated position 146 (see FIG. 2E).

The inner movable portion 134 is movable and actuated with a plurality of pistons 150 (see FIGS. 1A, 2E, 2F) coupled to the outer side 143a of the inner movable portion 134. The plurality of pistons 150, such as a plurality of pneumatic air pistons 150a (see FIGS. 2E, 2F), are preferably coupled to portions of the outer side 143a of the inner movable portion 134 with an adhesive material or another suitable coupling material or element. The plurality of pistons 150 may comprise the plurality of pneumatic air pistons 150a (see FIGS. 1A, 2E, 2F), a plurality of hydraulic pistons 150b (see FIG. 1A), or another suitable type of piston 150. The plurality of pistons 150 are preferably actuated via an actuation system 190 (see FIGS. 1B, 4) coupled to the AM apparatus 10. The actuation system 190 (see FIGS. 1B, 4) may comprise a pneumatic actuation system 190a (see FIGS. 1B, 4), a hydraulic actuation system 190b (see FIGS. 1B, 4), or another suitable actuation system 190, discussed in detail below with respect to FIG. 4. For example, the plurality of pistons 150 may be actuated with a fluid 198 (see FIG. 4), such as compressed air 198a (see FIG. 4), hydraulic fluid 198b (see FIG. 4), or another suitable fluid 198. The fluid 198 is introduced from the actuation system 190, through the interior channels 188 of the telescoping structures 170, and into the part holder apparatus 120 as inflow 157a (see FIGS. 2E, 2F) through a part holder apparatus input line 158a (see FIG. 4). The plurality of pistons 150 may be retracted, when the fluid 198, such as the compressed air 198a, the hydraulic fluid 198b, or another fluid 198, is pulled out or flows out of the part holder apparatus 120 as outflow 157b (see FIGS. 2E, 2F) through a part holder apparatus output line 158b (see FIG. 4).

As shown in FIG. 2E, the inner movable portion 134 is movable in an inward direction 145a, when actuated by the plurality of pistons 150, and the inner side 143b of the inner movable portion 134 compresses against, or exerts pressure against, an outer portion 148 of the built part 22a. The outer portion 148 of one or more of the one or more built parts 22a is preferably held by the inner movable portion 134 of the part holder apparatus 120. As shown in FIG. 2E, the plurality of pistons 150 are in an actuated position 156a. As shown in FIG. 2F, the inner movable portion 134 is movable in an outward direction 145b, when the plurality of pistons 150 retract to a stowed position 156b and release the built part 22a (see FIG. 2E), or built parts 22a.

As shown in FIGS. 2E and 2F, the plurality of pistons 150 may preferably be positioned in a piston area portion 152 of the part holder apparatus 120, between the outer side 143*a* of the inner movable portion 134 and the inner side 131*b* of the outer stationary portion 124. As further shown in FIGS. 2E and 2F, each of the plurality of pistons 150, such as the plurality of pneumatic air pistons 150*a*, has a head portion 154*a* coupled to the outer side 143*a* of the inner movable portion 134, and a cylinder portion 154*b* coupled to the head portion 154*a*. The cylinder portion 154*b* may be retractable or collapsible, or have the ability to reduce in height, from the actuated position 156*a* (see FIG. 2E) to the stowed position 156*b* (see FIG. 2F).

Now referring to FIGS. 3A-3B, FIG. 3A is an illustration of a top sectional view of an exemplary version of an electromagnetic actuation system 160 that may be used with a version of the AM apparatus 10 (see FIGS. 1A-1B, 2A, 2D) of the disclosure. FIG. 3B is an illustration of an enlarged left side partial sectional view of the electromagnetic actuation system 160 of FIG. 3A attached to a part holder apparatus 120 and attached to a laser beam delivery apparatus 90.

The part detachment assembly 80 (see FIGS. 1A-1B, 2A-2D) may further comprise the electromagnetic actuation system 160 (see FIGS. 1A-1B, 2A-2D, 3A-3B) coupled to the lower or bottom portion of the outer stationary portion 124 (see FIGS. 1A-1B, 2A-2D, 3A-3B) of the part holder apparatus 120 (see FIGS. 1A-1B, 2A-2D, 3A-3B). The electromagnetic actuation system 160 is further coupled to each of the one or more laser beam delivery apparatuses 90 (see FIGS. 1A-1B, 2A-2D, 3B), via one or more connecting members 123 (see FIGS. 2A-2D, 3B). The electromagnetic actuation system 160 is operable to rotate the one or more laser beam delivery apparatuses 90 at certain distances about the center 121 (see FIGS. 1A, 2E) of the part holder apparatus 120 during the cutting operation 84 (see FIGS. 1A-1B, 2B, 2D).

As shown in FIGS. 3A-3B, the electromagnetic actuation system 160 comprises a ball screw assembly 161 coupled to the part holder apparatus 120. The ball screw assembly 161 comprises a circular ball screw 162 (see FIGS. 3A-3B) that may be comprised of a single unitary piece, or may be comprised of several pieces connected or welded together. Each circular ball screw 162 may comprise a plastic ball screw 162*a* (see FIGS. 3A-3B), a metal ball screw, or another suitable type of ball screw. As further shown in FIGS. 3A-3B, each circular ball screw 162 comprises a plurality of threads 163 formed along the length or circumference of the circular ball screw 162, where the plurality of threads 163 hold, or are configured to hold, a plurality of ball bearings 164, such that the plurality of ball bearings 164 are coupled to the circular ball screw 162. The plurality of ball bearings 164 may comprise silicon nitride ball bearings 164*a* (see FIG. 3B), metal ball bearings, or another suitable type of ball bearing 164.

As shown in FIGS. 3A-3B, the electromagnetic actuation system 160 further comprises one or more nuts 165, such as one or more ball nuts 165*a*. Each of the one or more nuts 165, such as the one or more ball nuts 165*a*, is coupled to the one or more circular ball screws 162. The ends of each nut 165 are in contact with portions of the circular ball screw 162 to form a wall up to the circular ball screw 162, to retain the plurality of ball bearings 164 within the circular ball screw 162 area surrounded by the nut 165. The one or more nuts 165 are preferably actuated or moved by a motor and resolver apparatus 167 (see FIGS. 3A-3B) coupled to one of the nuts 165 and coupled to a portion of the circular ball screw 162. When one of the nuts 165 is actuated or moved by the motor and resolver apparatus 167 over a portion of the ball bearings 164 along the circular ball screw 162, it causes the other nuts 165 to move in unison over other portions of the ball bearings 164 along the circular ball screws 162.

As shown in FIGS. 3A-3B, the electromagnetic actuation system 160 further comprises one or more spacer bars 166 adjacent to each end of the one or more nuts 165 and positioned above the circular ball screw 162 and in alignment with the circular ball screw 162. The one or more spacer bars 166 assist in controlling the movement of the one or more nuts 165 along the circular ball screw 162. With more than one nut 165, for example, when one nut 165 moves and moves against a spacer bar 166 adjacent to one end of the nut 165, the spacer bar 166, in turn, moves against the next successive nut 165 along the circular ball screw 162, and in turn against the next spacer bar 166, and so on, so that all other nuts 165 and spacer bars 166 also move, or are configured to move, in unison, or together.

As shown in FIGS. 3A-3B, the electromagnetic actuation system 160 further comprises a power line connection 168 connected to the power system 72 (see FIGS. 1B, 2A), such as with the electrical power source 73, via connection element 75, for the AM apparatus 10 of the AM system 14, to power the electromagnetic actuation system 160. As shown in FIGS. 3A-3B, the electromagnetic actuation system 160 further comprises one or more communication lines 169, including a first communication line 169*a* and a second communication line 169*b*, for communicating with the computer 76 (see FIGS. 1B, 2A) having the software program 78 of the control system 74 (see FIGS. 1B, 2A), via connection element 75.

FIG. 3B further shows the laser beam delivery apparatus 90, such as in the form of laser head apparatus 96, attached to the nut 165 via the connecting member 123. When the nut 165 is moved by the motor and resolver apparatus 167, it also simultaneously moves the the laser beam delivery apparatus 90, such as in the form of laser head apparatus 96, in a first sweep direction 104*a* and then back the opposite direction in a second sweep direction 104*b*, for a predetermined number of passes 100 (see FIG. 1A), to cut through the base 32 (see FIG. 2B) of the part 22 (see FIG. 2B), such as the built part 22*a* (see FIG. 2B), attached to the build plate 28 (see FIG. 2B).

FIG. 3B further shows inflow 157*a*, of fluid 198 (see FIG. 4) such as compressed air 198*a* (see FIG. 4) or hydraulic fluid 198*b* (see FIG. 4), flowing through the part holder apparatus input line 158*a*, and through a flow channel 159 in the part holder apparatus 120, to actuate the piston 150 against the inner movable portion 134. FIG. 3B shows the head portion 154*a* and the cylinder portion 154*b* of the piston 150. When the piston 150 (see FIG. 3B) moves from the actuated position 156*a* (see FIG. 2E) to the stowed position 156*b* (see FIG. 2F), the fluid 198 (see FIG. 4) flows back out through the flow channel 159, and through the part holder apparatus output line 158*b* as outflow 157*b*.

Figure 4:
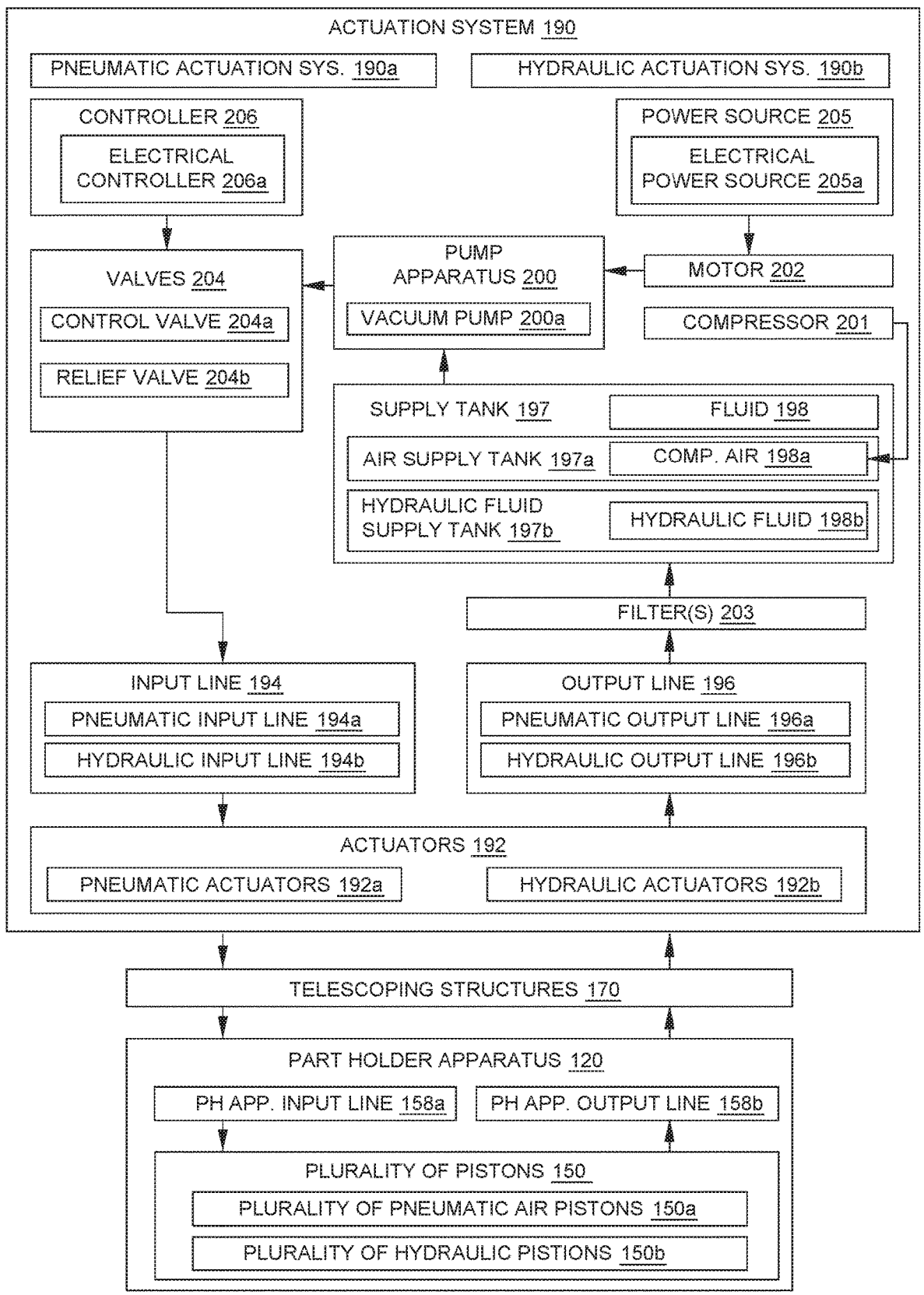
FIG. 4 is an illustration of a functional block diagram showing exemplary versions of an actuation system that may be used with versions of the additive manufacturing system of the disclosure.

Now referring to FIG. 4, FIG. 4 is an illustration of a functional block diagram showing exemplary versions of the actuation system 190 that may be used with versions of the AM system 14 (see FIG. 1B) of the disclosure. As shown in FIG. 4, the actuation system 190 may comprise a pneumatic actuation system 190*a* or a hydraulic actuation system 190*b*. However, the actuation system 190 is not limited to these actuation systems and other suitable actuation systems may be used.

As shown in FIG. 4, the actuation system 190 is coupled to the two or more telescoping structures 170, which are coupled to the part holder apparatus 120. As further shown in FIG. 4, the actuation system 190 comprises two or more actuators 192 (see also FIGS. 2A-2D), such as two or more pneumatic actuators 192a (see also FIGS. 2A-2D) for the pneumatic actuation system 190a, or such as two or more hydraulic actuators 192b for the hydraulic actuation system 190b. As shown in FIG. 2A, one actuator 192, such as one pneumatic actuator 192a, is coupled to the first telescoping structure 170a through a housing opening 56, such as a second housing opening 56b, formed through a portion 58 of the exterior 54 of the housing structure 50. As further shown in FIG. 2A, another actuator 192, such as another pneumatic actuator 192a, is coupled to the second telescoping structure 170b through a housing opening 56, such as a third housing opening 56c, formed through a portion 58 of the exterior 54 of the housing structure 50.

As shown in FIG. 4, the actuation system 190 further comprises an input line 194 (see also FIGS. 2A-2D), such as a pneumatic input line 194a (see also FIGS. 2A-2D) for the pneumatic actuation system 190a, or such as a hydraulic input line 194b for the hydraulic actuation system 190b. The input line 194 (see FIGS. 2A, 4) is coupled to the actuators 192.

As shown in FIG. 4, the actuation system 190 further comprises an output line 196 (see also FIGS. 2A-2D), such as a pneumatic output line 196a (see also FIGS. 2A-2D) for the pneumatic actuation system 190a, or such as a hydraulic output line 196b for the hydraulic actuation system 190b. The output line 196 (see FIGS. 2A, 4) is also coupled to the actuators 192.

As shown in FIG. 4, the actuation system 190 may further comprise one or more filters 203 coupled to the output line 196, to filter out any unwanted materials or particles. As shown in FIG. 4, the actuation system 190 further comprises fluid 198, such as compressed air 198a for the pneumatic actuation system 190a, or hydraulic fluid 198b for the hydraulic actuation system 190b. The fluid 198 may be stored in a supply tank 197 (see FIG. 4). For example, the compressed air 198a may be compressed by a compressor 201 (see FIG. 4) and stored in an air supply tank 197a (see FIG. 4). Alternatively, the pneumatic actuation system 190a (see FIG. 4) may intake air from the ambient environment, and the ambient air may be compressed with the compressor 201 (see FIG. 4), to obtain the compressed air 198a, and the compressed air 198a is used directly by the pneumatic actuation system 190a. The hydraulic actuation system 190b may include a hydraulic fluid supply tank 197b (see FIG. 4) for storing the hydraulic fluid 198b.

As shown in FIG. 4, the actuation system 190 may further comprise a pump apparatus 200, such as a vacuum pump 200a, for pumping the fluid 198, such as the compressed air 198a, or the hydraulic fluid 198b, out of the actuation system 190, and drawing the fluid 198, such as the compressed air 198a, or the hydraulic fluid 198b, back into the actuation system 190. The pump apparatus 200, such as the vacuum pump 200a, may be operated with a motor 202 (see FIG. 4), or another suitable power device or apparatus. The motor 202 may be powered with a power source 205 (see FIG. 4), such as an electrical power source 205a (see FIG. 4), or another suitable power source 205.

As shown in FIG. 4, the actuation system 190 may further comprise a plurality of valves 204 coupled to the pump apparatus 200, the input line 194, and to a controller 206. As shown in FIG. 4, the plurality of valves 204 comprise a control valve 204a and a relief valve 204b. However, additional valves 204 may also be included. The controller 206, such as an electrical controller 206a (see FIG. 4), or another suitable type of controller 206, controls the opening and closing of the valves 204, and may control other operations of the actuation system 190.

After the build operation 26 (see FIG. 2A), the actuation system 190 (see FIGS. 2B, 4) actuates, with the actuators 192 (see FIGS. 2B, 4), the two or more telescoping structures 170 (see FIGS. 2B, 4) downward from the stowed position 174 (see FIG. 2A) to the fully extended position 176 (see FIG. 2B). In particular, the fluid 198 (see FIG. 4), such as the compressed air 198a (see FIG. 4), or the hydraulic fluid 198b (see FIG. 4), flows through the input line 194 (see FIGS. 2B, 4) to actuate the actuators 192 (see FIGS. 2B, 4), and flows through the interior channel 188 (see FIG. 2B) of the telescoping structures 170, to actuate, extend, and move downwardly the cylindrical telescoping portions 184 (see FIG. 2B) of each telescoping structure 170, until the cylindrical telescoping portions 184 are fully extended and the telescoping structures 170 are in the fully extended position 176 (see FIG. 2B).

Once the two or more telescoping structures 170 are in the fully extended position 176 (see FIG. 2B), the interior channel 188 is controlled to open to the part holder apparatus 120 and allows the fluid 198 (see FIG. 4), such as the compressed air 198a (see FIG. 4) for the pneumatic actuation system 190a (see FIG. 4), or the hydraulic fluid 198b (see FIG. 4) for the hydraulic actuation system 190b (see FIG. 4), to flow as inflow 157a (see FIG. 3B) into the part holder apparatus input line 158a (see FIGS. 3B, 4), to flow through the flow channel 159 (see FIG. 3B), and to actuate the plurality of pistons 150 (see FIGS. 2E, 4), such as the plurality of pneumatic air pistons 150a (see FIGS. 2E, 4) for the pneumatic actuation system 190a, or such as the plurality of hydraulic pistons 150b (see FIG. 4) for the hydraulic actuation system 190b, to the actuated position 156a (see FIG. 2E). Once a sufficient amount of the fluid 198, such as the compressed air 198a, or the hydraulic fluid 198b, is introduced into the part holder apparatus 120 to actuate the plurality of pistons 150 to the actuated position 156a (see FIG. 2E) to actuate the part holder apparatus 120 to the actuated position 146 (see FIG. 2E), the interior channel 188 may be controlled to close to the part holder apparatus 120 to stop the inflow 157a. In the actuated position 156a, the plurality of pistons 150 are moved to compress against the inner movable portion 134 (see FIGS. 2B, 2E) of the part holder apparatus 120, so that the inner movable portion 134 compresses against the outer portion 148 (see FIG. 2E) of the built part 22a (see FIG. 2E), to hold the built part 22a, or multiple built parts 22c (see FIG. 5B), in place during the cutting operation 84 (see FIGS. 2B, 2D), and after the cutting operation 84, as needed.

After the cutting operation 84 (see FIGS. 2B, 2D), the actuation system 190 (see FIGS. 2B, 4) draws or pulls in with the pump apparatus 200 (see FIG. 4), the fluid 198 (see FIG. 4), such as the compressed air 198a (see FIG. 4) or the hydraulic fluid 198b (see FIG. 4), up through the interior channel 188 (see FIG. 2C) of the telescoping structures 170, which moves the telescoping structures 170 upwardly from the fully extended position 176 (see FIG. 2B) to the partially extended position 178 (see FIG. 2C), and back to the stowed position 174 (see FIG. 2A). The fluid 198 (see FIG. 4), such as the compressed air 198a (see FIG. 4) or the hydraulic fluid 198b (see FIG. 4), flows out through the output line 196 (see FIG. 2C, 4), is filtered with one or more filters 203, and is stored in the supply tank 197 (see FIG. 4), such as the air supply tank 197a (see FIG. 4), or the hydraulic fluid supply tank 197b (see FIG. 4). Alternatively, the compressed air 198a may be vented out.

When it is desired that the inner movable portion 134 of the part holder apparatus 120 release the built part 22a (see FIGS. 2C, 2E) or multiple built parts 22c (see FIG. 5B) being held, the interior channel 188 (see FIG. 2C) of each telescoping structure 170 (see FIG. 2C) may be controlled to open to the part holder apparatus 120 and to allow the fluid 198 (see FIG. 4), such as the compressed air 198a (see FIG. 4) for the pneumatic actuation system 190a (see FIG. 4), or the hydraulic fluid 198b (see FIG. 4) for the hydraulic actuation system 190b (see FIG. 4), to flow through the flow channel 159 (see FIG. 3B), through the part holder apparatus output line 158b (see FIGS. 3B, 4), and out of the part holder apparatus 120 as outflow 157b (see FIG. 3B). The outflow 157b comprising the fluid 198, such as the compressed air 198a, or the hydraulic fluid 198b, is drawn or pulled up with the pump apparatus 200 (see FIG. 4), and flows back up through the interior channel 188, flows through the output line 196 (see FIGS. 2C, 4), is filtered with one or more filters 203, and is stored in the supply tank 197 (see FIG. 4), such as the air supply tank 197a (see FIG. 4), or the hydraulic fluid supply tank 197b (see FIG. 4). Alternatively, the compressed air 198a may be vented out. Once the fluid 198, such as the compressed air 198a, or the hydraulic fluid 198b, is removed from the part holder apparatus 120, the plurality of pistons 150 (see FIGS. 2F, 4), such as the plurality of pneumatic air pistons 150a (see FIGS. 2E, 4) for the pneumatic actuation system 190a, or such as the plurality of hydraulic pistons 150b (see FIG. 4) for the hydraulic actuation system 190b, are moved back to the stowed position 156b (see FIG. 2F), and the inner movable portion 134 (see FIG. 2F) expands back to a non-compressed shape, which results in the built part 22a (see FIG. 2C, 2E), or multiple built parts 22c (see FIG. 5B), being released. The part holder apparatus 120 (see FIG. 2F) returns to the stowed position 147 (see FIG. 2F).

Now referring to FIGS. 5A-5B, FIG. 5A is an illustration of a top schematic view of an exemplary version of four (4) laser beam delivery apparatuses 90, such as in the form of four (4) laser head apparatuses 96, each delivering a cutting laser beam 92 to detach a built part 22a, such as a single built part 22b, from a build plate 28. FIG. 5B is an illustration of a top schematic view of the four (4) laser beam delivery apparatuses 90, such as in the form of four (4) laser head apparatuses 96, of FIG. 5A, each delivering a cutting laser beam 92 to detach built parts 22a, such as multiple built parts 22c, from a build plate 28.

As shown in FIGS. 5A-5B, each laser beam delivery apparatus 90, such as in the form of laser head apparatus 96, is coupled to one end of an optical fiber 98. For example, the four (4) laser head apparatuses 96 are coupled to four (4) optical fibers 98, including a first laser head apparatus 96a coupled to a first optical fiber 98a, a second laser head apparatus 96b coupled to a second optical fiber 98b, a third laser head apparatus 96c coupled to a third optical fiber 98c, and a fourth laser head apparatus 96d coupled to a fourth optical fiber 98d. The four (4) optical fibers 98 are coupled at the other end to an optical fiber splitter apparatus 99 (see FIGS. 5A-5B). The optical fiber splitter apparatus 99 is coupled to the laser cutting apparatus 94 (see FIGS. 5A-5B), such as in the form of a neodymium YAG laser 95 (see FIGS. 5A-5B). The laser cutting apparatus 94 is coupled to a laser power source 108 (see FIGS. 5A-5B), such as an electrical power source 108a (see FIGS. 5A-5B). Alternatively, each optical fiber 98 may be coupled directly to an individual laser cutting apparatus 94, for example, if more than one laser cutting apparatuses 94 are used, or if the optical fiber splitter apparatus 99 is not needed.

As further shown in FIGS. 5A-5B, each laser head apparatus 96 has a laser head tip 97 (see FIGS. 5A-5B) pointed toward, and delivering a cutting laser beam 92 to, the base 32 (see FIG. 5A) of the single built part 22b (see FIG. 5A), or the bases 32 (see FIG. 5B) of the multiple built parts 22c (see FIG. 5B). The four (4) laser head apparatuses 96 (see FIGS. 5A-5B) are each positioned toward and spaced around the single built part 22b (see FIG. 5A), or the multiple built parts 22c (see FIG. 5B), being cut. As shown in FIGS. 5A-5B, each of the four (4) laser head apparatuses 96 are in a spaced relationship 102 comprising a 90° (ninety degree) spaced relationship 102a, spaced 90° (ninety degrees) apart from each other. In another example, the laser beam delivery apparatuses 90 may comprise two (2) laser beam delivery apparatuses 90 comprising two (2) laser head apparatuses 96 positioned toward and spaced around the one or more built parts 22a to be cut. Each of the two (2) laser head apparatuses 96 may be in a spaced relationship 102 (see FIG. 1A), such as a 180° (one-hundred eighty degree) spaced relationship 102b (see FIG. 1A), spaced 180° (one-hundred eighty degrees) apart from each other.

As further shown in FIGS. 5A-5B, each laser beam delivery apparatus 90, such as in the form of laser head apparatus 96, is coupled to a connecting member 123 (see also FIGS. 2A-2D). The connecting member 123, in turn, is connected to the electromagnetic actuation system 160 (see FIG. 3B), which is coupled to the part holder apparatus 120 (see FIG. 3B). The four (4) laser head apparatuses 96 are preferably each coupled, via the connecting member 123, to the electromagnetic actuation system 160 connected to the part holder apparatus 120. With four (4) laser beam delivery apparatuses 90, such as in the form of four (4) laser head apparatuses 96, the electromagnetic actuation system 160 (see FIG. 3B) is operable to rotate or move each laser beam delivery apparatus 90 (see FIGS. 5A-5B), such as in the form of laser head apparatus 96 (see FIGS. 5A-5B), in a first sweep direction 104a (see FIGS. 5A-5B) in an arc of 45° (forty-five degrees) and then back in the opposite direction in a second sweep direction 104b (see FIGS. 5A-5B) in an arc of 45° (forty-five degrees), for a total sweep of 90° (ninety degrees). The electromagnetic actuation system 160 (see FIGS. 1A-1B, 3B) is preferably operable to simultaneously rotate each of the four (4) laser head apparatuses 96 +/−45° (plus or minus forty-five degrees) for a predetermined number of passes 100 (see FIG. 1A) to cut through the base 32 (see FIGS. 5A-5B) of each of the one or more built parts 22a (see FIGS. 5A-5B).

Instead of laser head apparatuses 96 (see FIGS. 5A-5B), the laser beam delivery apparatuses 90 may be in the form of optics devices 110 (see FIGS. 1A-1B, 2D), such as mirrors 111 (see FIGS. 1A, 2D), each coupled, via attachment elements 113 (see FIG. 2D), to the electromagnetic actuation system 160 (see FIG. 2D), which is coupled to the part holder apparatus 120 (see FIG. 2D). The optics devices 110 (see FIGS. 1A, 2D) are preferably positioned around the one or more built parts 22a (see FIGS. 1A, 2D) to be cut.

When the laser beam delivery apparatuses 90 comprise four (4) laser beam delivery apparatuses 90 in the form of four (4) optics devices 110 (see FIGS. 1A-1B), such as four (4) mirrors 111 (see FIG. 1A), the four (4) optics devices 110, such as four (4) mirrors 111, are preferably in a spaced relationship 102 (see FIG. 1A), such as a 90° (ninety degree) spaced relationship 102a (see FIG. 1A), spaced 90° (ninety degrees) apart from each other. The electromagnetic actuation system 160 is operable to simultaneously rotate each of the four (4) mirrors 111 +/−45° (plus or minus forty-five degrees) for a predetermined number of passes 100 (see FIG.

1A) to cut through the base 32 (see FIG. 1A) of each of the one or more built parts 22a (see FIG. 1A). The laser beam splitter device 116 (see FIGS. 1A, 2D) rotates, via the electric turntable apparatus 118 (see FIG. 2D), in unison with the four (4) mirrors 111 (see FIG. 1A) when the four (4) mirrors 111 are simultaneously rotated.

When the laser beam delivery apparatuses 90 comprise two (2) laser beam delivery apparatuses 90 comprising two (2) optics devices 110, such as two (2) mirrors 111, each of the two (2) mirrors 111 may be in a spaced relationship 102 (see FIG. 1A), such as a 180° (one-hundred eighty degree) spaced relationship 102b (see FIG. 1A), spaced 180° (one-hundred eighty degrees) apart from each other.

Figure 6:
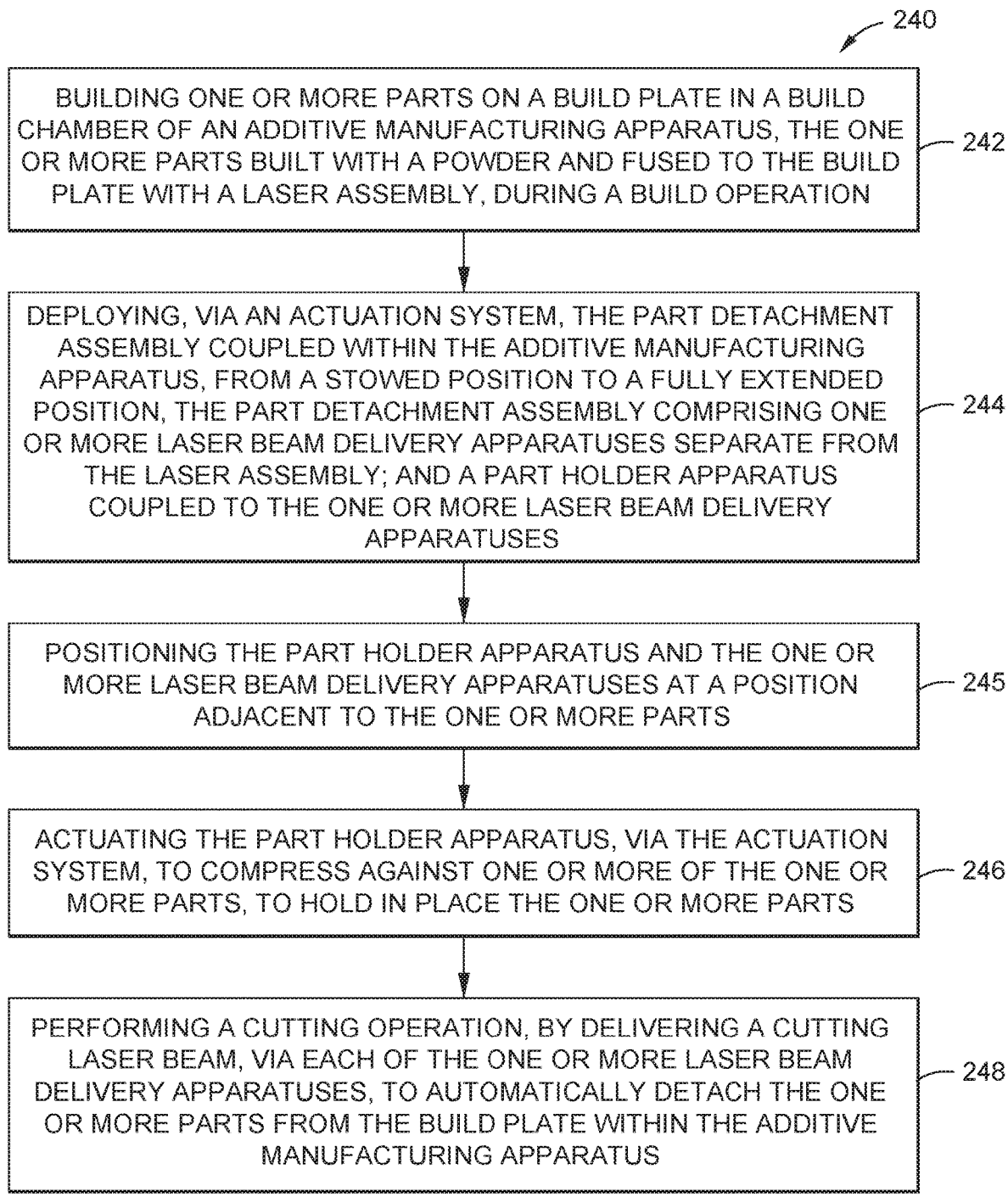
FIG. 6 is an illustration of a flowchart of steps of an exemplary version of a method of the disclosure.

Now referring to FIG. 6, FIG. 6 is an illustration of a flowchart of steps of an exemplary version of a method 240 of the disclosure. The blocks in FIG. 6 represent operations and/or portions thereof, and lines connecting the various blocks do not imply any particular order or dependency of the operations or portions thereof. FIG. 6 and the disclosure of the steps of the method 240 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

In another version, there is provided the method 240 (see FIG. 6) of using the additive manufacturing (AM) apparatus 10 (see FIGS. 1A-1B), such as AM apparatus 10a (see FIG. 1B), with a part detachment assembly 80 (see FIGS. 1A-1B), such as in the form of part detachment assembly 80a (see FIGS. 2A-2C), or part detachment assembly 80b (see FIG. 2D), to automatically detach one or more parts 22, such as one or more built parts 22a (see FIGS. 2B, 2D), built during an additive manufacturing (AM) process 12 (see FIGS. 1A-1B), such as a selective laser melting (SLM) AM process 13 (see FIGS. 1A-1B), or another suitable AM process 12.

As shown in FIG. 6, the method 240 comprises the step 242 of building one or more parts 22 (see FIGS. 1A-1B, 2A) on a build plate 28 (see FIGS. 1A-1B, 2A) in a build chamber 20 (see FIGS. 1A-1B, 2A) of the AM apparatus 10 (see FIGS. 1A-1B, 2A). The one or more parts 22 (see FIGS. 1A-1B, 2A) are built with a powder 24 (see FIGS. 1A-1B, 2A), during the build operation 26 (see FIGS. 1A-1B, 2A) of the AM process 12. In one version, the one or more parts 22 are built on, and fused to, the build plate 28 (see FIGS. 1A-1B, 2A), with a laser assembly 60 (see FIGS. 1A-1B, 2A), during the build operation 26, to obtain one or more built parts 22a (see FIGS. 1A-1B, 2A) attached to the build plate 28. After the one or more parts 22 are built in the build chamber 20, the unused build material 23a (see FIGS. 1A-1B, 2A), such as unused powder 24a (see FIGS. 1A-1B, 2A), from the build chamber 20, is removed from the build chamber 20 and removed off of the built part 22a with a powder removal apparatus, such as a vacuum apparatus 48 (see FIG. 1B), or another suitable powder removal apparatus or system.

The step 242 of building the one or more parts 22 on the build plate 28 may further comprise building the one or more parts 22 on one or more support structures 33 (see FIGS. 1A-1B) built with the powder 24 (see FIGS. 1A-1B) and fused to the build plate 28 (see FIGS. 1A-1B, 2A) with the laser assembly 60 (see FIGS. 1A-1B, 2A). The one or more support structures 33 (see FIGS. 1A-1B) may comprise one or more stilts 33a (see FIGS. 1A-1B, 2A), one or more pegs 33b (see FIGS. 1A-1B, 2A), one or more projections 33c (see FIGS. 1A-1B, 2A), or another suitable type of support structure 33, to support the one or more parts 22 on the build plate 28.

As shown in FIG. 6, the method 240 further comprises the step 244 of deploying, via an actuation system 190 (see FIGS. 1B, 2A-2D, 4), the part detachment assembly 80 (see FIGS. 1B, 2A-2D) coupled within a housing structure 50 (see FIGS. 1A-1B, 2A) of the additive manufacturing apparatus 10, from a stowed position 174 (see FIG. 2A) to a fully extended position 176 (see FIG. 2B). As discussed in detail above, the part detachment assembly 80 (see FIGS. 1A-1B, 2A-2D) comprises one or more laser beam delivery apparatuses 90 (see FIGS. 1A-1B, 2A-2D) separate from the laser assembly 60. The part detachment assembly 80 further comprises a part holder apparatus 120 (see FIGS. 1A-1B, 2A-2D) coupled to the one or more laser beam delivery apparatuses 90.

The part detachment assembly 80 may further comprise an electromagnetic actuation system 160 (see FIGS. 1A-1B, 2A-2D) coupled to the part holder apparatus 120, and further coupled to the one or more laser beam delivery apparatuses 90. The part detachment assembly 80 may further comprise two or more telescoping structures 170 (see FIGS. 1A-1B, 2A-2D) coupled to the part holder apparatus 120, and further coupled to the housing structure 50 of the AM apparatus 10.

The step 244 (see FIG. 6) of deploying, via the actuation system 190 (see FIG. 4), the part detachment assembly 80, comprises deploying, via the actuation system 190 comprising one of, a pneumatic actuation system 190a (see FIG. 4), and a hydraulic actuation system 190b (see FIG. 4).

As shown in FIG. 6, the method 240 further comprises the step 245 of positioning the part holder apparatus 120 (see FIGS. 1A-1B, 2B) and the one or more laser beam delivery apparatuses 90 (see FIGS. 1A-1B, 2B) at a position 210 (see FIG. 2B) adjacent to the one or more parts 22 (see FIG. 2B), such as the one or more built parts 22a (see FIG. 2B).

As shown in FIG. 6, the method 240 further comprises the step 246 of actuating the part holder apparatus 120 (see FIG. 2B), via the actuation system 190 (see FIG. 2B), to compress against one or more of the one or more parts 22 (see FIG. 2B), to hold in place the one or more parts 22.

The step 246 (see FIG. 6) of actuating the part holder apparatus 120, may comprise actuating a plurality of pistons 150 (see FIGS. 2E) coupled to an inner movable portion 134 (see FIG. 2E) of the part holder apparatus 120 (see FIG. 2E), to compress the inner movable portion 134 against an outer portion 148 (see FIG. 2E) of one or more of the one or more parts 22 (see FIG. 2E), to hold in place the one or more parts 22 during the cutting operation 84 (see FIGS. 1A-1B, 2B).

As shown in FIG. 6, the method 240 further comprises the step 248 of performing a cutting operation 84 (see FIG. 2B), by delivering a cutting laser beam 92 (see FIGS. 2B, 2D), via each of the one or more laser beam delivery apparatuses 90 (see FIGS. 2B, 2D), to preferably cut through a base 32 (see FIGS. 2B, 2D) of each of the one or more parts 22 (see FIGS. 2B, 2D), such as the one or more built parts 22a (see FIGS. 2B, 2D), to automatically detach the one or more parts 22, such as the one or more built parts 22a, from the build plate 28 (see FIGS. 2B, 2D) within the AM apparatus 10 (see FIGS. 2B, 2D).

The step 248 (see FIG. 6) of performing the cutting operation 84 (see FIGS. 1A-1B, 2B), by delivering the cutting laser beam 92, comprises performing the cutting operation 84 by delivering the cutting laser beam 92, via each of the one or more laser beam delivery apparatuses 90 comprising one of, one or more laser head apparatuses 96 (see FIG. 2B) coupled to a laser cutting apparatus 94 (see FIG. 2B), or one or more optics devices 110 (see FIG. 2D) angled relative to a laser beam splitter device 116 (see FIG. 2D) positioned above the one or more optics devices 110. The laser beam splitter device 116 (see FIG. 2D) is angled to receive the cutting laser beam 92 (see FIG. 2D) from the laser cutting apparatus 94 (see FIG. 2D).

The step 248 (see FIG. 6) of performing the cutting operation 84 (see FIGS. 1A-1B, 2B) further comprises using the electromagnetic actuation system 160 (see FIGS. 1A-1B, 3A-3B) to simultaneously rotate each of the one or more laser beam delivery apparatuses 90 for a predetermined number of passes 100 (see FIG. 1A) to cut through the base 32 (see FIGS. 1A-1B) of each of the one or more parts 22, such as the one or more built parts 22a (see FIGS. 1A-1B).

The step 248 (see FIG. 6) of performing the cutting operation 84 further comprises providing an automated detachment 212 (see FIGS. 1A-1B) of the one or more built parts 22a (see FIGS. 1A-1B) from the build plate 28 (see FIGS. 1A-1B), to avoid, prior to the cutting operation 84 (see FIGS. 1A-1B), a manual removal 218 (see FIGS. 1A-1B) of the build plate 28 with the attached one or more built parts 22a, from the AM apparatus 10 (see FIGS. 1A-1B), and to avoid a mechanical detachment 214 (see FIGS. 1A-1B) of the one or more built parts 22a from the build plate 28, outside of the AM apparatus 10.

Figure 7:
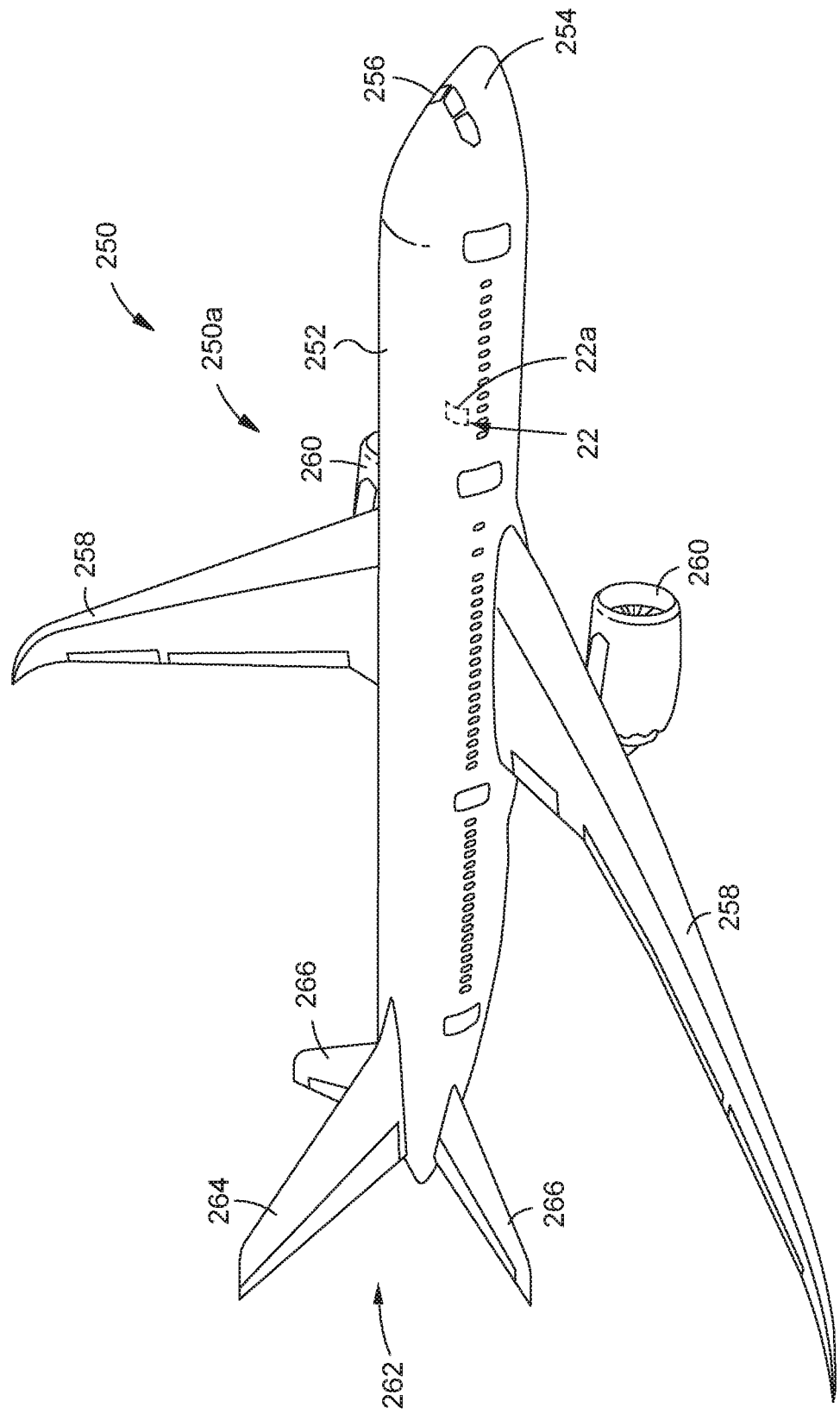
FIG. 7 is an illustration of a perspective view of an air vehicle that incorporates one or more parts manufactured using an exemplary version of an additive manufacturing apparatus and additive manufacturing system of the disclosure.

Now referring to FIG. 7, FIG. 7 is an illustration of a perspective view of an air vehicle 250, such as in the form of aircraft 250a, that incorporates one or more parts 22, such as one or more built parts 22a, manufactured using an exemplary version of the additive manufacturing (AM) apparatus 10 (see FIGS. 1A-1B) and the additive manufacturing (AM) system 14 (see FIG. 1B) for an additive manufacturing (AM) process 12 (see FIGS. 1A-1B) of the disclosure.

As shown in FIG. 7, the air vehicle 250, such as in the form of aircraft 250a, comprises a fuselage 252, a nose 254, a cockpit 256, wings 258, engines 260, and an empennage 262 comprising horizontal stabilizers 264 and a vertical stabilizer 266. The air vehicle 250 (see FIG. 7), such as in the form of aircraft 250a (see FIG. 7), comprises one or more parts 22, such as built parts 22a, installed within the aircraft 250a, or alternatively, installed in the engines 260, the wings 258, the empennage 262, or other suitable areas of the aircraft 250a.

Figure 8:
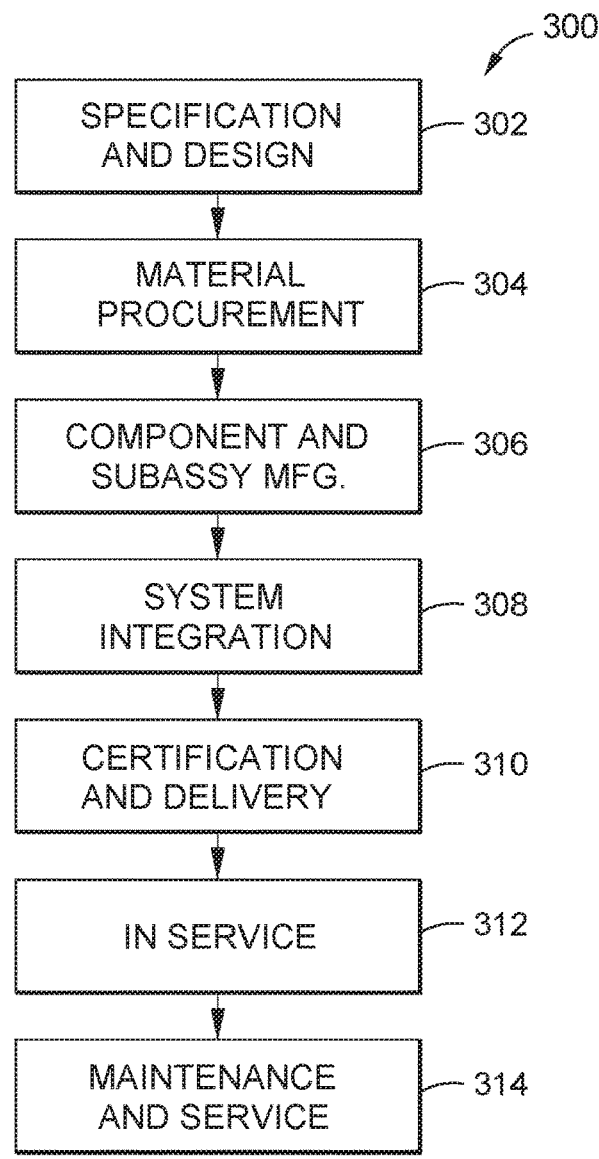
FIG. 8 is an illustration of a flow diagram of an exemplary aircraft manufacturing and service method.
Figure 9:
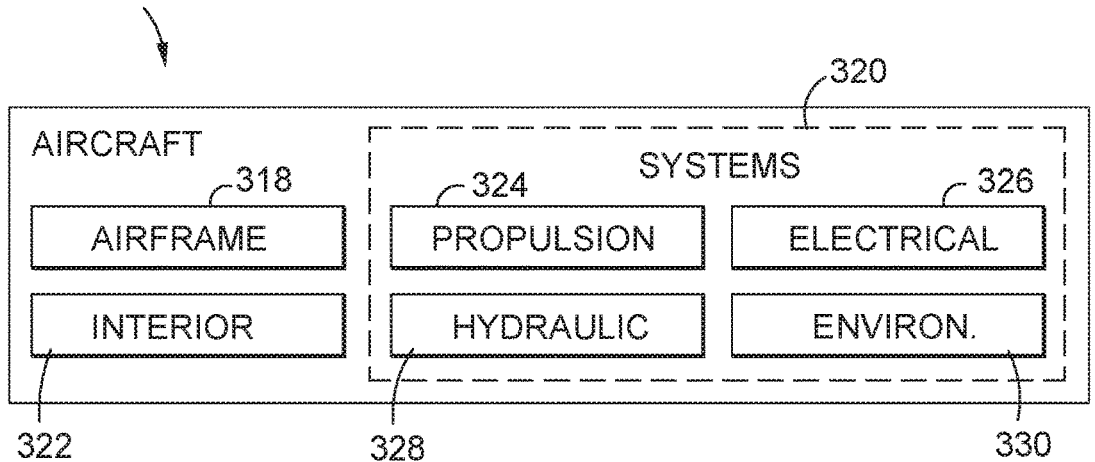
FIG. 9 is an illustration of an exemplary block diagram of an aircraft.

Now referring to FIGS. 8 and 9, FIG. 8 is an illustration of a flow diagram of an exemplary aircraft manufacturing and service method 300, and FIG. 9 is an illustration of an exemplary block diagram of an aircraft 316. Referring to FIGS. 8 and 9, versions of the disclosure may be described in the context of the aircraft manufacturing and service method 300 as shown in FIG. 8, and the aircraft 316 as shown in FIG. 9.

During pre-production, exemplary aircraft manufacturing and service method 300 may include specification and design 302 of the aircraft 316 and material procurement 304. During manufacturing, component and subassembly manufacturing 306 and system integration 308 of the aircraft 316 takes place. Thereafter, the aircraft 316 may go through certification and delivery 310 in order to be placed in service 312. While in service 312 by a customer, the aircraft 316 may be scheduled for routine maintenance and service 314 (which may also include modification, reconfiguration, refurbishment, and other suitable services).

Each of the processes of the aircraft manufacturing and service method 300 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 9, the aircraft 316 produced by the exemplary aircraft manufacturing and service method 300 may include an airframe 318 with a plurality of systems 320 and an interior 322. Examples of the plurality of systems 320 may include one or more of a propulsion system 324, an electrical system 326, a hydraulic system 328, and an environmental system 330. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 300. For example, components or subassemblies corresponding to component and subassembly manufacturing 306 may be fabricated or manufactured in a manner similar to components or subassemblies produced while the aircraft 316 is in service 312. Also, one or more apparatus embodiments, method embodiments, or a combination thereof, may be utilized during component and subassembly manufacturing 306 and system integration 308, for example, by substantially expediting assembly of or reducing the cost of the aircraft 316. Similarly, one or more of apparatus embodiments, method embodiments, or a combination thereof, may be utilized while the aircraft 316 is in service 312, for example and without limitation, to maintenance and service 314.

Disclosed versions of the additive manufacturing (AM) apparatus 10 (see FIG. 1A) and the additive manufacturing (AM) system 14, both having the part detachment assembly 80 (see FIGS. 1A-1B, 2A-2D), and the method 240 (see FIG. 6) provide for the addition of an array of laser beam delivery apparatuses 90, such as laser head apparatuses 96, or optics devices 110, for example, in the form of mirrors 111, positioned in the interior of the AM apparatus 10, and positioned directly adjacent to the one or more parts 22, such as the one or more built parts 22a, to be detached or cut, to allow detachment or cutting, inside the AM apparatus 10, of the one or more parts 22, such as the one or more built parts 22a, from the build plate 28, with one or more cutting laser beams 92 delivered by the array of laser beam delivery apparatuses 90. The laser beam delivery apparatuses 90 are preferably coupled, via optical fibers, to a high power laser cutting apparatus 94, such as a neodymium YAG laser 95, that may be positioned inside the AM apparatus 10, or positioned outside the AM apparatus 10.

In addition, the one or more parts 22, such as the one or more built parts 22a, may be raised on the build plate 28 and built on one or more support structures 33 (see FIG. 1A), such as one or more stilts 33a (see FIG. 1A), one or more pegs 33b (see FIG. 1A), or one or more projections 33c (see FIG. 1A), built up on the build plate 28, so that the base 32 (see FIG. 2B) or bottom of each part 22, such as each built part 22a, may be clearly exposed to each cutting laser beam 92 and cutting laser beam path. Either the one or more parts 22, such as the one or more built parts 22a, and/or the array of laser beam delivery apparatuses 90 are preferably configured such that the portion, such as the base 32 of each part 22, such as each built part 22a, that is being cut, is exposed to multiple laser passes, such as a predetermined number of passes 100 (see FIG. 1A).

In situ and on site detachment and removal of one or more parts 22, such as the one or more built parts 22a, from the build plate 28 in the build chamber 20 (see FIG. 2A) of the AM apparatus 10 of the AM system 14 is enabled. The part detachment assembly 80 (see FIGS. 2A-2D) provides an automated detachment 212 (see FIGS. 1A-1B) of the one or more parts 22, such as the one or more built parts 22a from the build plate 28, to avoid, prior to the cutting operation 84 (see FIGS. 1A-1B), a manual removal 218 (see FIGS. 1A-1B) of the build plate 28 with the attached one or more parts 22, such as the one or more built parts 22a, from out of the AM apparatus 10, and to avoid a mechanical detachment 214 (see FIGS. 1A-1B) of the one or more parts 22, such as the one or more built parts 22a from the build plate 28, outside of the AM apparatus 10. Moreover, the part detachment assembly 80 avoids having to transport the build plate 28 with the attached parts 22, such as the attached built parts 22a, to a lathe, cutting tool, or other machining tool to mechanically cut or separate the one or more parts 22, such as the one or more built parts 22a, from the build plate 28.

Further, disclosed versions of the AM apparatus 10 (see FIG. 1A) and the AM system 16, and the method 240 (see FIG. 6), provide for a part holder apparatus 120 (see FIGS. 1A-1B, 2A-2D), as part of the part detachment assembly 80, to hold or secure the one or more parts 22 (see FIGS. 2B, 2D), such as the one or more built parts 22a (see FIGS. 2B, 2D), during and/or after the cutting operation 84 (see FIGS. 1A-1B, 2B, 2D), so as to keep the one or more parts 22, such as the one or more built parts 22a, in place, and so as to keep the one or more parts 22, such as the one or more built parts 22a, from falling over during and/or after the cutting operation 84.

Many modifications and other versions of the disclosure will come to mind to one skilled in the art to which this disclosure pertains having the benefit of the teachings presented in the foregoing descriptions and the associated drawings. The versions described herein are meant to be illustrative and are not intended to be limiting or exhaustive. Although specific terms are employed herein, they are used in a generic and descriptive sense only and not for purposes of limitation.

What is claimed is:

1. An additive manufacturing apparatus for an additive manufacturing process, the additive manufacturing apparatus comprising:
   a build chamber comprising a build plate to support one or more parts built with a powder, during a build operation;
   a laser assembly operable to deliver a melting laser beam, to melt and fuse the powder used to build the one or more parts; and
   a part detachment assembly, separate from the laser assembly and operable for a cutting operation, the part detachment assembly comprising:
      one or more laser beam delivery apparatuses, each operable to deliver a cutting laser beam; and
      a part holder apparatus coupled to the one or more laser beam delivery apparatuses, the part detachment assembly operable to move, after the build operation, so that the part holder apparatus and the one or more laser beam delivery apparatuses are at a position adjacent to the one or more parts,
      wherein during the cutting operation, the part holder apparatus holds the one or more parts, and each of the one or more laser beam delivery apparatuses delivers the cutting laser beam, to detach the one or more parts from the build plate within the additive manufacturing apparatus.

2. The additive manufacturing apparatus of claim 1, further comprising a housing structure that houses the build chamber, the laser assembly, and the part detachment assembly.

3. The additive manufacturing apparatus of claim 2, wherein the part detachment assembly further comprises two or more telescoping structures coupled to the housing structure, and further coupled to the part holder apparatus.

4. The additive manufacturing apparatus of claim 1, wherein the part detachment assembly further comprises an electromagnetic actuation system coupled to the part holder apparatus and to the one or more laser beam delivery apparatuses, the electromagnetic actuation system operable to rotate the one or more laser beam delivery apparatuses during the cutting operation.

5. The additive manufacturing apparatus of claim 1, wherein the one or more laser beam delivery apparatuses comprise one or more laser head apparatuses, each of the one or more laser head apparatuses coupled to an optical fiber, and each optical fiber coupled to one of, a laser cutting apparatus, or an optical fiber splitter apparatus coupled to the laser cutting apparatus.

6. The additive manufacturing apparatus of claim 5, wherein the laser cutting apparatus comprises a neodymium yttrium-aluminum-garnet (YAG) laser having a laser power in a range of from 6 kW (six kilowatts) to 10 kW (ten kilowatts).

7. The additive manufacturing apparatus of claim 1, wherein the one or more laser beam delivery apparatuses comprise four (4) laser beam delivery apparatuses comprising four (4) laser head apparatuses positioned around the one or more parts to be detached, each of the four (4) laser head apparatuses spaced 90° (ninety degrees) apart from each other.

8. The additive manufacturing apparatus of claim 7, wherein the four (4) laser head apparatuses are coupled to an electromagnetic actuation system connected to the part holder apparatus, the electromagnetic actuation system operable to simultaneously rotate each of the four (4) laser head apparatuses +/−45° (plus or minus forty-five degrees) for a predetermined number of passes to cut through the base of each of the one or more parts.

9. The additive manufacturing apparatus of claim 1, wherein the one or more laser beam delivery apparatuses comprise one or more optics devices, each angled relative to one or more incident angles of a laser beam splitter device positioned above the one or more optics devices, and further wherein the laser beam splitter device is angled to receive the cutting laser beam from a laser cutting apparatus and to transmit the cutting laser beam to the one or more optics devices.

10. The additive manufacturing apparatus of claim 9, wherein the one or more optics devices comprise four (4) mirrors positioned around the one or more parts to be detached, each of the four (4) mirrors spaced 90° (ninety degrees) apart from each other, and further wherein the laser beam splitter device is connected to an electric turntable apparatus.

11. The additive manufacturing apparatus of claim 10, wherein the four (4) mirrors are coupled to an electromagnetic actuation system connected to the part holder apparatus, the electromagnetic actuation system operable to simultaneously rotate each of the four (4) mirrors, and further wherein the laser beam splitter device rotates, via the electric turntable apparatus, in unison with the four (4) mirrors, when the four (4) mirrors are simultaneously rotated.

12. The additive manufacturing apparatus of claim 1, wherein the part holder apparatus comprises an outer stationary portion, and an inner movable portion movable to compress against one or more of the one or more parts, to hold in place the one or more parts, the inner movable portion movable with a plurality of pistons coupled to the inner movable portion, the plurality of pistons actuated via an actuation system.

13. The additive manufacturing apparatus of claim 1, wherein the part detachment assembly provides an automated detachment of the one or more parts from the build plate, to avoid, prior to the cutting operation, a manual removal of the build plate with the attached one or more parts, from the additive manufacturing apparatus, and to avoid a mechanical detachment of the one or more parts from the build plate, outside of the additive manufacturing apparatus.

14. An additive manufacturing system for an additive manufacturing process, the additive manufacturing system comprising:
an additive manufacturing apparatus comprising:
a housing structure that houses:
a build chamber comprising a build plate to support one or more parts built with a powder, during a build operation;
a laser assembly operable to deliver a melting laser beam, to melt and fuse the powder used to build the one or more parts; and
a part detachment assembly, separate from the laser assembly and operable for a cutting operation, the part detachment assembly comprising:
one or more laser beam delivery apparatuses, each operable to deliver a cutting laser beam;
a part holder apparatus coupled to the one or more laser beam delivery apparatuses, the part detachment assembly operable to move, after the build operation, so that the part holder apparatus and the one or more laser beam delivery apparatuses are at a position adjacent to the one or more parts; and;
an electromagnetic actuation system coupled to the part holder apparatus and to the one or more laser beam delivery apparatuses, the electromagnetic actuation system operable to rotate the one or more laser beam delivery apparatuses during the cutting operation,
wherein during the cutting operation, the part holder apparatus holds the one or more parts, and each of the one or more laser beam delivery apparatuses delivers the cutting laser beam, to detach the one or more parts from the build plate within the additive manufacturing apparatus.

15. The additive manufacturing system of claim 14, wherein the additive manufacturing system comprises a selective laser melting (SLM) additive manufacturing system, and the additive manufacturing apparatus comprises a selective laser melting (SLM) additive manufacturing apparatus.

16. The additive manufacturing system of claim 14, wherein the one or more laser beam delivery apparatuses, comprise one of, one or more laser head apparatuses coupled to a laser cutting apparatus, or one or more optics devices angled relative to a laser beam splitter device positioned above the one or more optics devices, the laser beam splitter device angled to receive the cutting laser beam from the laser cutting apparatus.

17. The additive manufacturing system of claim 14, wherein the part detachment assembly further comprises two or more telescoping structures coupled to the housing structure, and further coupled to the part holder apparatus.

18. The additive manufacturing system of claim 14, further comprising an actuation system coupled to the additive manufacturing apparatus, to actuate the part detachment assembly.

19. A method of using an additive manufacturing system having an additive manufacturing apparatus with a part detachment assembly, to automatically detach one or more parts, built during an additive manufacturing process, the method comprising the steps of:
building one or more parts on a build plate in a build chamber of the additive manufacturing apparatus, the one or more parts built with a powder and fused to the build plate with a laser assembly of the additive manufacturing apparatus, during a build operation, the laser assembly delivering a melting laser beam, to melt and fuse the powder;
deploying, via an actuation system of the additive manufacturing system, the part detachment assembly coupled within the additive manufacturing apparatus, from a stowed position to a fully extended position, the part detachment assembly comprising:
one or more laser beam delivery apparatuses separate from the laser assembly; and
a part holder apparatus coupled to the one or more laser beam delivery apparatuses;
positioning the part holder apparatus and the one or more laser beam delivery apparatuses at a position adjacent to the one or more parts, via telescoping structures of the part detachment assembly actuated via the actuation system;
actuating the part holder apparatus, via the actuation system, to compress against one or more of the one or more parts, to hold in place the one or more parts; and
performing a cutting operation, by delivering a cutting laser beam, via each of the one or more laser beam delivery apparatuses, to automatically detach the one or more parts from the build plate within the additive manufacturing apparatus.

20. The method of claim 19, wherein deploying, via the actuation system, the part detachment assembly, comprises deploying, via the actuation system comprising one of, a pneumatic actuation system, and a hydraulic actuation system.

21. The method of claim 19, wherein deploying, via the actuation system, the part detachment assembly, comprises deploying the part detachment assembly further comprising an electromagnetic actuation system coupled to the part holder apparatus, and coupled to the one or more laser beam delivery apparatuses, and further comprising two or more telescoping structures coupled to the part holder apparatus, and further coupled to a housing structure of the additive manufacturing apparatus.

22. The method of claim 21, wherein performing the cutting operation further comprises using the electromagnetic actuation system to simultaneously rotate each of the one or more laser beam delivery apparatuses for a predetermined number of passes to cut through a base of each of the one or more parts.

23. The method of claim 19, wherein performing the cutting operation by delivering the cutting laser beam, comprises performing the cutting operation by delivering the cutting laser beam, via each of the one or more laser beam delivery apparatuses comprising one of, one or more laser head apparatuses coupled to a laser cutting apparatus, or one or more optics devices angled relative to a laser beam splitter device positioned above the one or more optics devices, the laser beam splitter device angled to receive the cutting laser beam from the laser cutting apparatus.

24. The method of claim 19, wherein building the one or more parts on the build plate further comprises building the one or more parts on one or more support structures built with the powder and fused to the build plate with the laser assembly, the one or more support structures comprising one or more stilts, one or more pegs, or one or more projections.

* * * * *